US012478877B2

(12) United States Patent
Yamamoto et al.

(10) Patent No.: US 12,478,877 B2
(45) Date of Patent: Nov. 25, 2025

(54) STORAGE MEDIUM, GAME SYSTEM, GAME APPARATUS, AND GAME PROCESSING METHOD

(71) Applicant: Nintendo Co., Ltd., Kyoto (JP)

(72) Inventors: Naoya Yamamoto, Kyoto (JP); Daigo Shimizu, Kyoto (JP); Tadashi Sakamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 259 days.

(21) Appl. No.: 18/500,697

(22) Filed: Nov. 2, 2023

(65) Prior Publication Data

US 2024/0252923 A1 Aug. 1, 2024

(30) Foreign Application Priority Data

Feb. 1, 2023 (JP) ................................ 2023-014039

(51) Int. Cl.

*A63F 13/5378* (2014.01)
*A63F 13/5258* (2014.01)
*A63F 13/5372* (2014.01)

(52) U.S. Cl.

CPC ...... *A63F 13/5378* (2014.09); *A63F 13/5258* (2014.09); *A63F 13/5372* (2014.09)

(58) Field of Classification Search

CPC .............. A63F 13/5378; A63F 13/5258; A63F 13/5372

(Continued)

(56) References Cited

U.S. PATENT DOCUMENTS 7,367,882 B2 * 5/2008 Fukutome ............... A63F 13/47 463/40
8,597,120 B2 * 12/2013 Kawai ..................... A63F 13/52 463/31

(Continued)

FOREIGN PATENT DOCUMENTS

| | | |
|---|---|---|
| JP | 2009-056181 | 3/2009 |
| JP | 2018-000740 | 1/2018 |
| JP | 2023-004507 | 1/2023 |

OTHER PUBLICATIONS

The Legend of Zelda: Ocarina of Time Instruction Booklet,(https://www.nintendo.com/eu/media/downloads/games_8/emanuals/nintendo_8/Manual_Nintendo64_TheLegendOfZeldaOcarinaOfTime_EN.pdf), published in 1998 (Year: 1998).*

(Continued)

*Primary Examiner* — Allen Chan
(74) *Attorney, Agent, or Firm* — Nixon & Vanderhye PC

(57) ABSTRACT

When a command is given to perform a long distance movement that causes a location of a player character to move from a departure point where the player character is currently located to a destination away from the departure point and designated based on the user's operation input, at least a portion of a game process is interrupted, a waiting period continuing until the interrupted game process is resumed is started, and until the end of the waiting period, first displaying is performed to display a first map image showing field information of the departure point and surroundings thereof, and after the first displaying, second displaying is performed to display a second map image showing field information of the destination and surroundings thereof, and after the end of the waiting period, the player character is disposed at the destination in the virtual space, and the interrupted game process is resumed.

28 Claims, 23 Drawing Sheets

(58) Field of Classification Search
USPC .............................................................. 463/31
See application file for complete search history.

(56) References Cited

U.S. PATENT DOCUMENTS

| | | | | |
|---|---|---|---|---|
| 11,420,122 | B2 * | 8/2022 | Sanders | A63F 13/798 |
| 2009/0104990 | A1 | 4/2009 | Tsujino et al. | |
| 2018/0008887 | A1 | 1/2018 | Nitta et al. | |
| 2022/0410006 | A1 | 12/2022 | Watanabe | |

OTHER PUBLICATIONS

Apr. 2, 2024 Office Action issued in Japanese Patent Application No. 2023-014039, pp. 1-7 [machine translation included].

[Cyberpunk 2077] Super fast travel! Grasef-style fast travel: Depending on how you use it, you can achieve the fastest movement! Vortex introduction explanation MOD introduction [Cyberpunk2077MOD], YouTube [online][video], Oct. 25, 2022, [Searched on Mar. 12, 2024], URL:https://www.youtube.com/watch?y=0kk7Xbt1278 especially see video time [00:00]-[06:55] pp. 1-21.

[Live] The Legend of Zelda BotW #2 [Painful when dropped from high altitude], YouTube[online][video], Mar. 5, 2017, [Searched on Mar. 14, 2024], URL://https://www.youtube.com/watch?v=T3KIWpULiX4 especially see video time [02:23]-[02:47], [23:37]-[25:11] pp. 1-12.

Dragon Quest I • II SFC version [extra edition] How to use the ruler, YouTube [online] [video], Jan. 4, 2019, [Searched on Mar. 13, 2024], URL:https://www.youtube.com/watch?v=hThdO4IjkLc especially see video time [00:10]-[00:30] pp. 1.5.

[Phantom Tower] How to unlock the map and how to use an area map [Tower of Fantasy], GameWith [online], Sep. 7, 2022, [Searched on Mar. 12, 2024], URL:https://gamewith.jp/toweroffantasy/article/show/352572 especially see the text and drawings; pp. 1-10.

"The Legend of Zelda: Breath of the Wild", [online], Nintendo of America Inc., [searched on Dec. 23, 2022], internet URL: https://www.zelda.com/breath-of-the-wild, search and printed on Nov. 1, 2023, 4 pages.

* cited by examiner

STORAGE MEDIUM, GAME SYSTEM, GAME APPARATUS, AND GAME PROCESSING METHOD

CROSS REFERENCE TO RELATED APPLICATION

This application claims priority to Japanese Patent Application No. 2023-014039, filed on Feb. 1, 2023, the entire contents of which are incorporated herein by reference.

FIELD

The technology disclosed herein relates to a storage medium, game system, game apparatus, and game processing method that execute a process of using a player character in a virtual space.

BACKGROUND AND SUMMARY

There has conventionally been a game program that is capable of executing a movement such as warp drive that allows a location of a player character in a virtual space to move to a distant location designated in a map (fast travel).

In such a game program, when a player character performs fast travel, tips such as hints, tricks, and advices for a game being played, which are presented to the user, are only displayed during a waiting period that loading and the like are executed with at least a portion of a game process interrupted.

With the above in mind, it is an object of the present example to provide a storage medium, game system, game apparatus, and game processing method that are capable of providing a greater variety of scenes during a waiting period that at least a portion of a game process is interrupted.

To achieve the object, the present example may have features (1) to (9) below, for example.

(1) An example configuration of a non-transitory computer-readable storage medium according to the present example has stored therein instructions that, when executed, cause one or more processors of an information processing apparatus to execute game processing comprising: executing a game process including controlling a player character in a field of a virtual space based on a user's operation input, and displaying a game image including the field based on a virtual camera; and when a command is given to perform a long distance movement that causes a location of the player character to move from a departure point where the player character is currently located to a destination that is away from the departure point and is designated based on the user's operation input, interrupting at least a portion of the game process, starting a waiting period that continues until the interrupted game process is resumed, until the end of the waiting period, first displaying a first map image showing field information of the departure point and surroundings thereof, and after the first displaying, second displaying a second map image showing field information of the destination and surroundings thereof, and after the end of the waiting period, disposing the player character at the destination in the virtual space, and resuming the interrupted game process.

With the configuration of (1), a more variety of scenes that are displayed during a waiting period that starts when a player character performs a long distance movement can be provided. In addition, in the scenes, a first map image showing field information of a departure point of the long distance movement and its surroundings and a second map image showing field information of a destination of the long distance movement and its surroundings are displayed, and therefore, the user can be notified of the statuses of the fields of the departure point and destination of the long distance movement. Therefore, the use can also experience feeling like the user moves in a field even during the waiting period.

(2) In the configuration of (1), the game processing may further comprise third displaying a field map image showing field information in the virtual space based on the user's operation input. The command to perform the long distance movement may be to designate a location in the field map image as the destination based on the user's operation input during the third displaying.

With the configuration of (2), a destination of a long distance movement can be set by designating a location in a map image. Therefore, the destination can be easily set at a location that is far away from a departure point in a virtual space or a location in a different field. In addition, the destination can be set with knowledge of a status of surroundings thereof.

(3) In the configuration of (2), the first map image may be a range of the field map image around the departure point, and the second map image may be a range of the field map image around the destination.

With the configuration of (3), the first and second map images can be easily generated using a field map image.

(4) In the configuration of (3), the field map image may include a portion in which the field information is disclosed and a portion in which the field information is undisclosed. The game processing may further comprise, when an event occurs at a location in the virtual space based on the game process, updating the field map image such that field information of a range corresponding to the location where the event occurs is disclosed.

With the configuration of (4), in a game in which field information of a map is unlocked, depending on progression of the game, the first and second map images that are displayed during the waiting period can be displayed, depending on a locked/unlocked status.

(5) In the configuration of (4), in the first displaying, the first map image may be generated by capturing a range around the departure point of the field map image including the portion in which the field information is disclosed and the portion in which the field information is undisclosed, and may be displayed, and in the second displaying, the second map image may be generated by capturing a range around the destination of the field map image including the portion in which the field information is disclosed and the portion in which the field information is undisclosed, and may be displayed.

With the configuration of (5), in the case in which the processing load of generating the first and second map images is great, the processing load of generating a map image can be reduced by capturing and displaying a portion of a field map image. In particular, when another process is executed during the waiting period, it is preferable that the processing load be reduced, and therefore, the configuration of (5) is effective.

(6) In the configuration of any one of (1) to (5), during a period of time in the first displaying, the first map image may be slid in a direction opposite to a direction from the departure point toward the destination in the map image, and may be displayed, and during a period of time in the second displaying, the second map image may be slid in a direction opposite to a direction from the departure point toward the destination in the map image, and may be displayed.

With the configuration of (6), a direction in which a player character is moved in a map image in a long distance movement can be intuitively recognized by the user.

(7) In the configuration of any one of (1) to (6), in the first displaying, an icon image showing a location of the player character may be displayed at the departure point in the first map image, and subsequently, may be deleted with first timing, and in the second displaying, the second map image without the icon image may be displayed, and subsequently, the icon image may be displayed at the destination in the second map image with second timing.

With the configuration of (7), a scene of a long distance movement in which a player character temporarily disappears from a location of a departure point in a map image and thereafter appears from a location of a destination can be intuitively recognized by the user.

(8) In the configuration of any one of (1) to (7), the game processing may further comprise: during the waiting period, storing data including at least data of a field of the destination into a memory; and ending the waiting period after completion of the storing.

With the configuration of (8), a more variety of scenes that are displayed during a period of time that data including at least data of a field of a destination is loaded can be provided.

(9) In the configuration of (8), the first displaying may be continued for at least a first period of time, and after the end of the first period of time, the second displaying may be started when a second period of time has elapsed or progression of the storing has reached a level.

With the configuration of (9), at least a period of time for the first displaying is allocated, and the second displaying is started, depending on the subsequent elapsed time or the progression of reading out, which is the earlier. Therefore, the second displaying of destination information, which is more important, can be started earlier during the waiting period.

In addition, the present example may be carried out in the forms of a game system, game apparatus, and game processing method.

According to the present example, a more variety of scenes that are displayed during a waiting period that starts when a player character performs a long distance movement can be provided.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the following description, a hardware configuration of the game system 1 of the present example is described, and thereafter, the control of the game system 1 of the present example is described.

Figure 1:
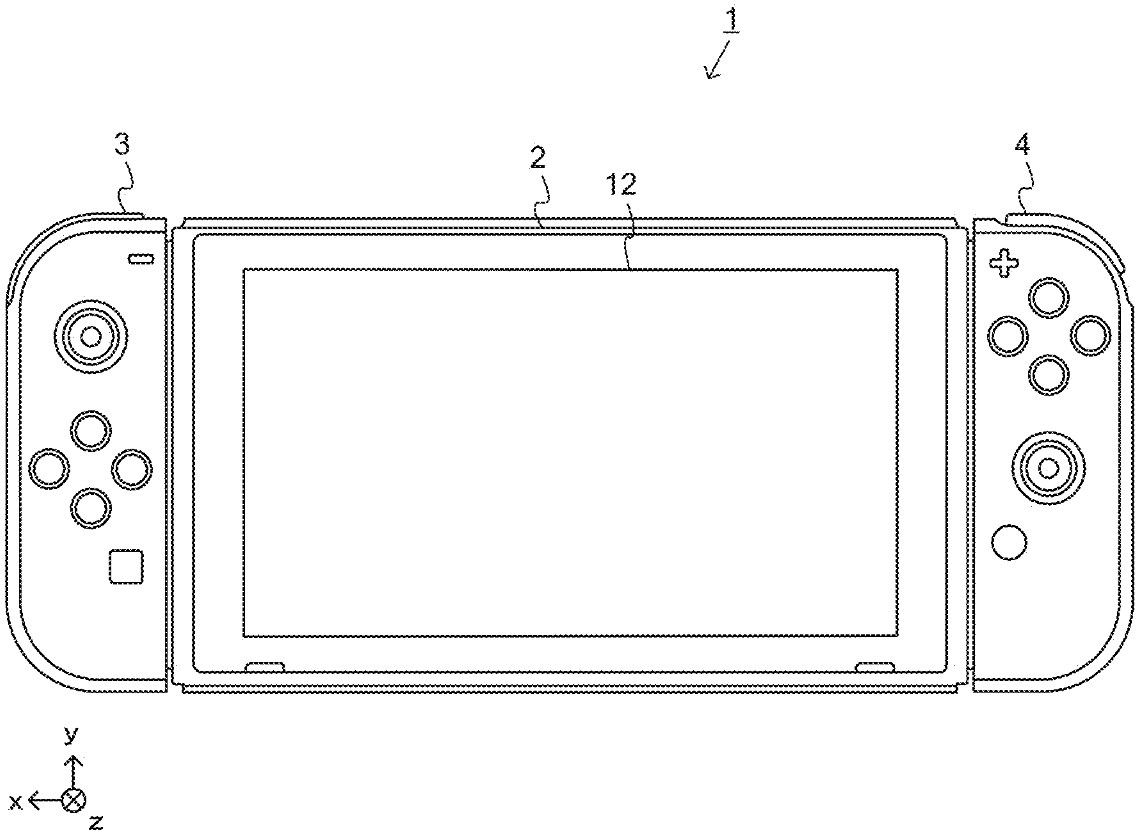
FIG. 1 is a diagram illustrating a non-limiting example of a state in which a left controller 3 and a right controller 4 are attached to a main body apparatus 2.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
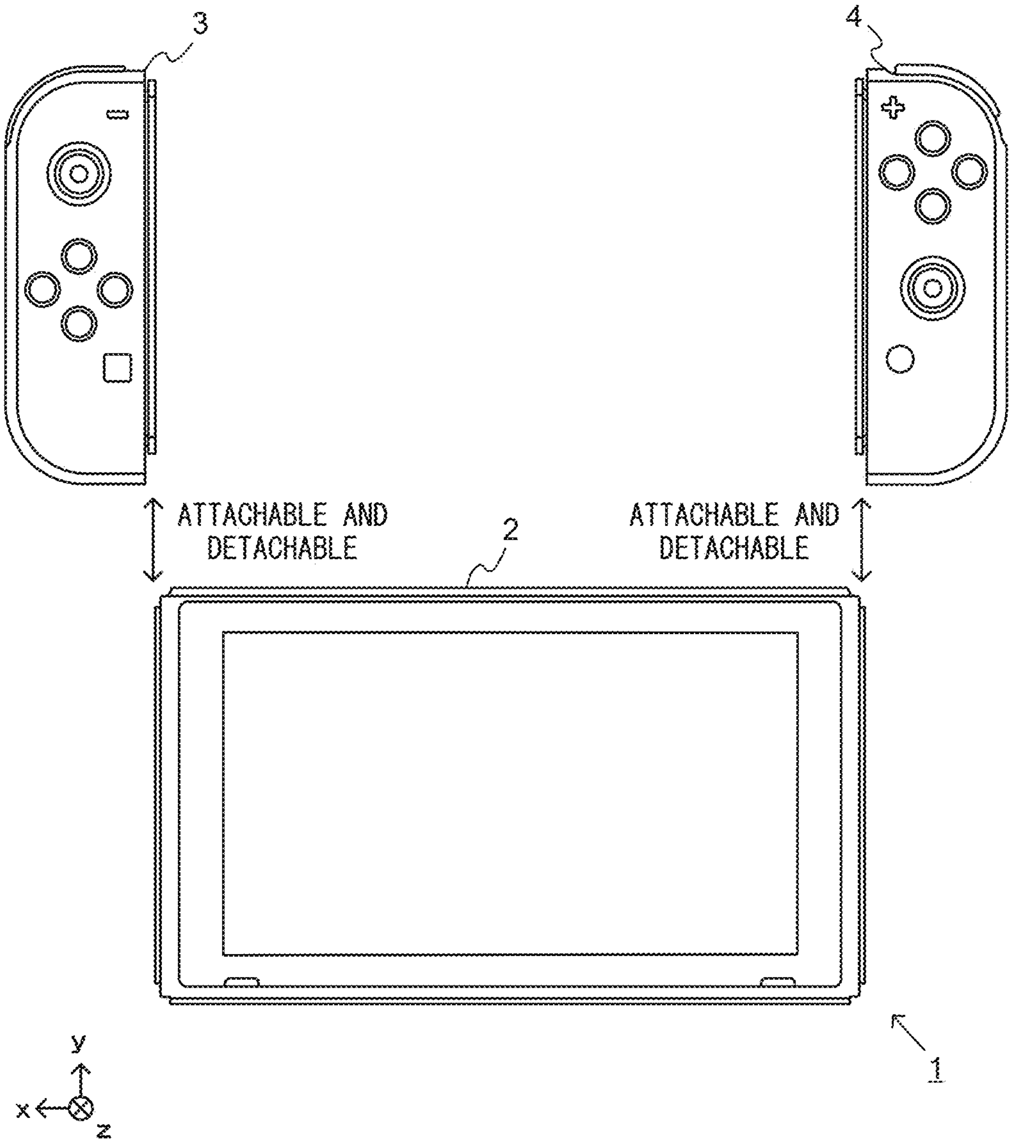
FIG. 2 is a diagram illustrating a non-limiting example of a state in which a left controller 3 and a right controller 4 are detached from a main body apparatus 2.

FIG. 2 is a diagram illustrating an example of a state in which each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
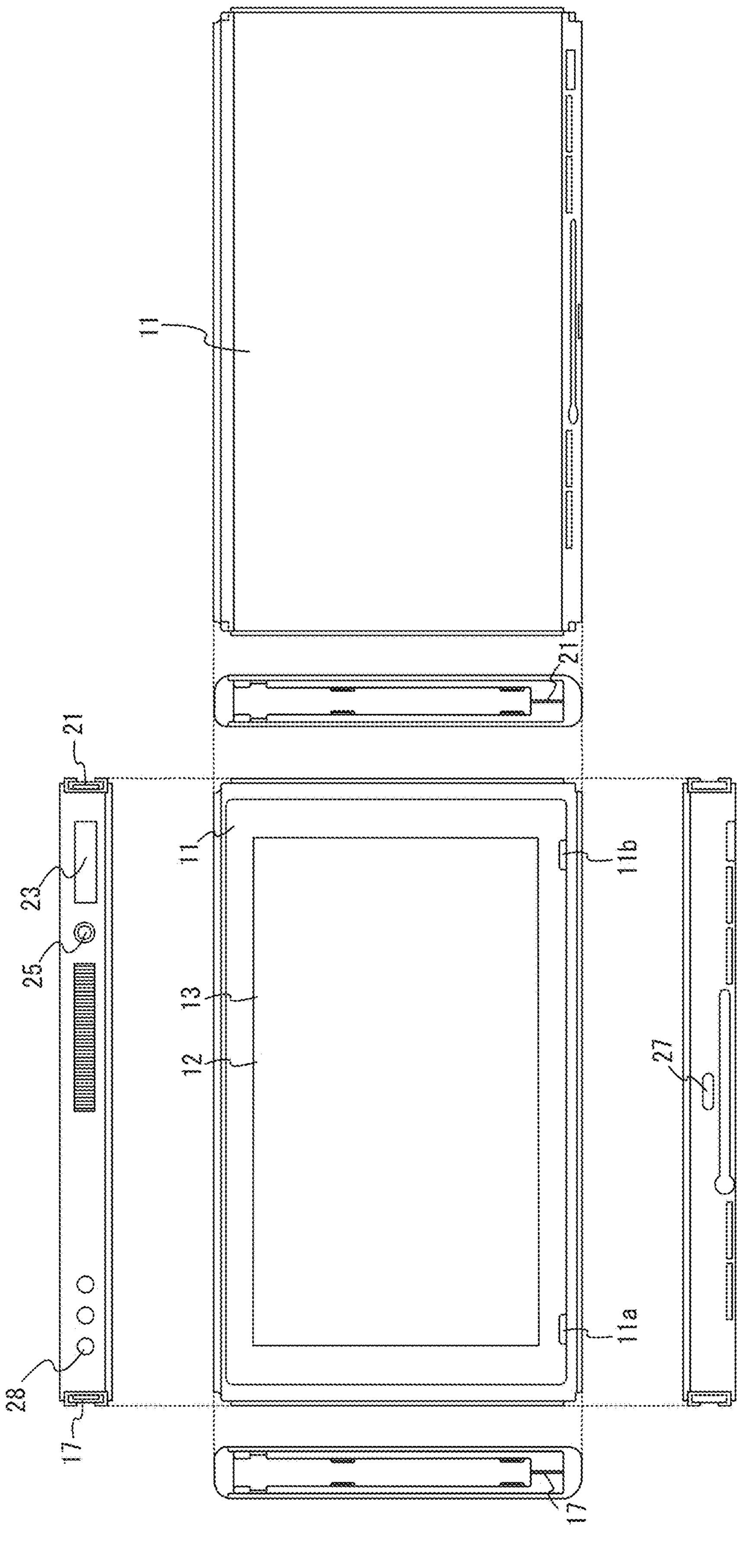
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
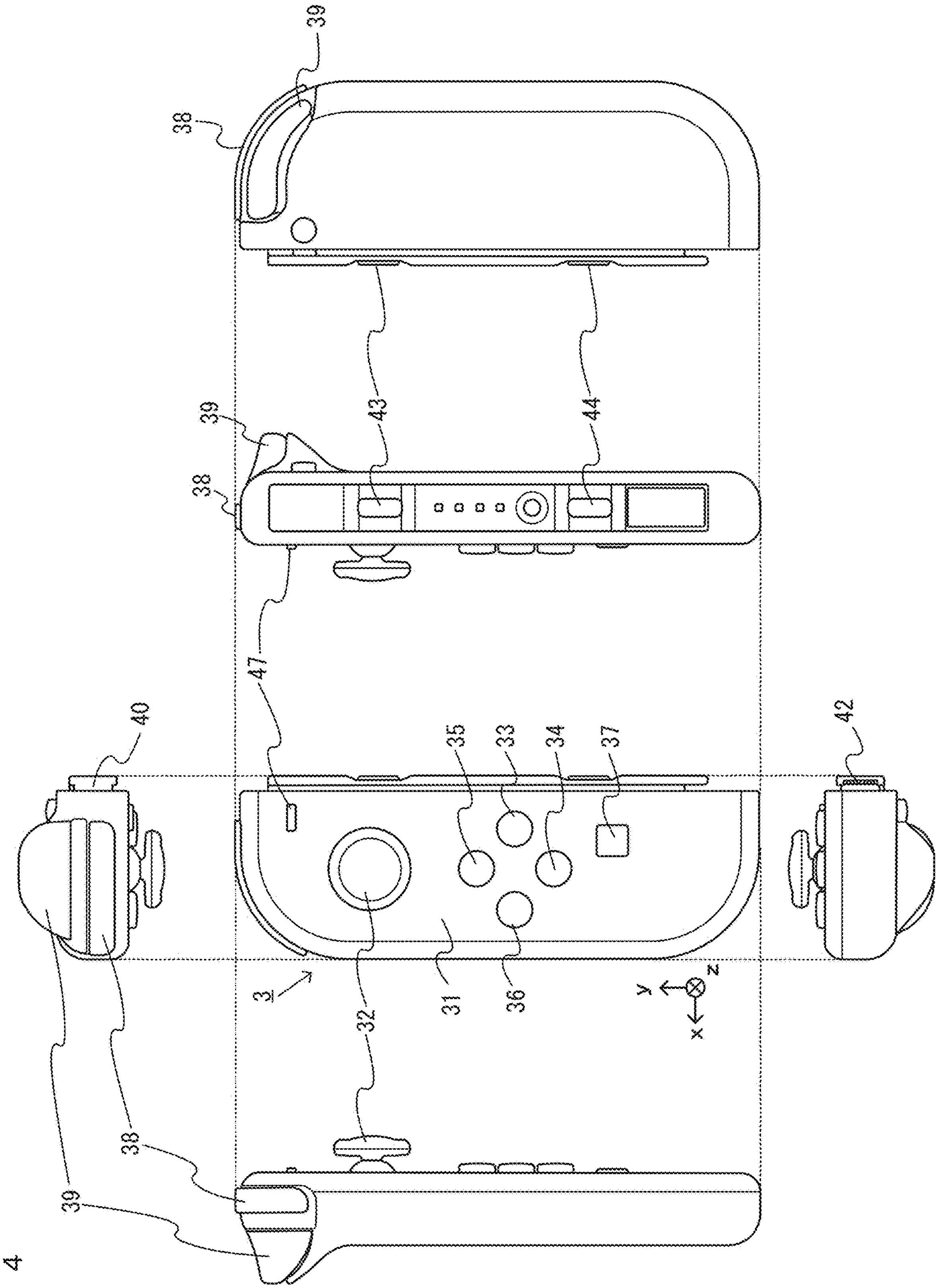
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state in which the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give commands depending on various programs (e.g., an OS program and an application program) executed by the main body apparatus 2.

The left controller 3 also includes a terminal 42 that enables wired communication between the left controller 3 and the main body apparatus 2.

Figure 5:
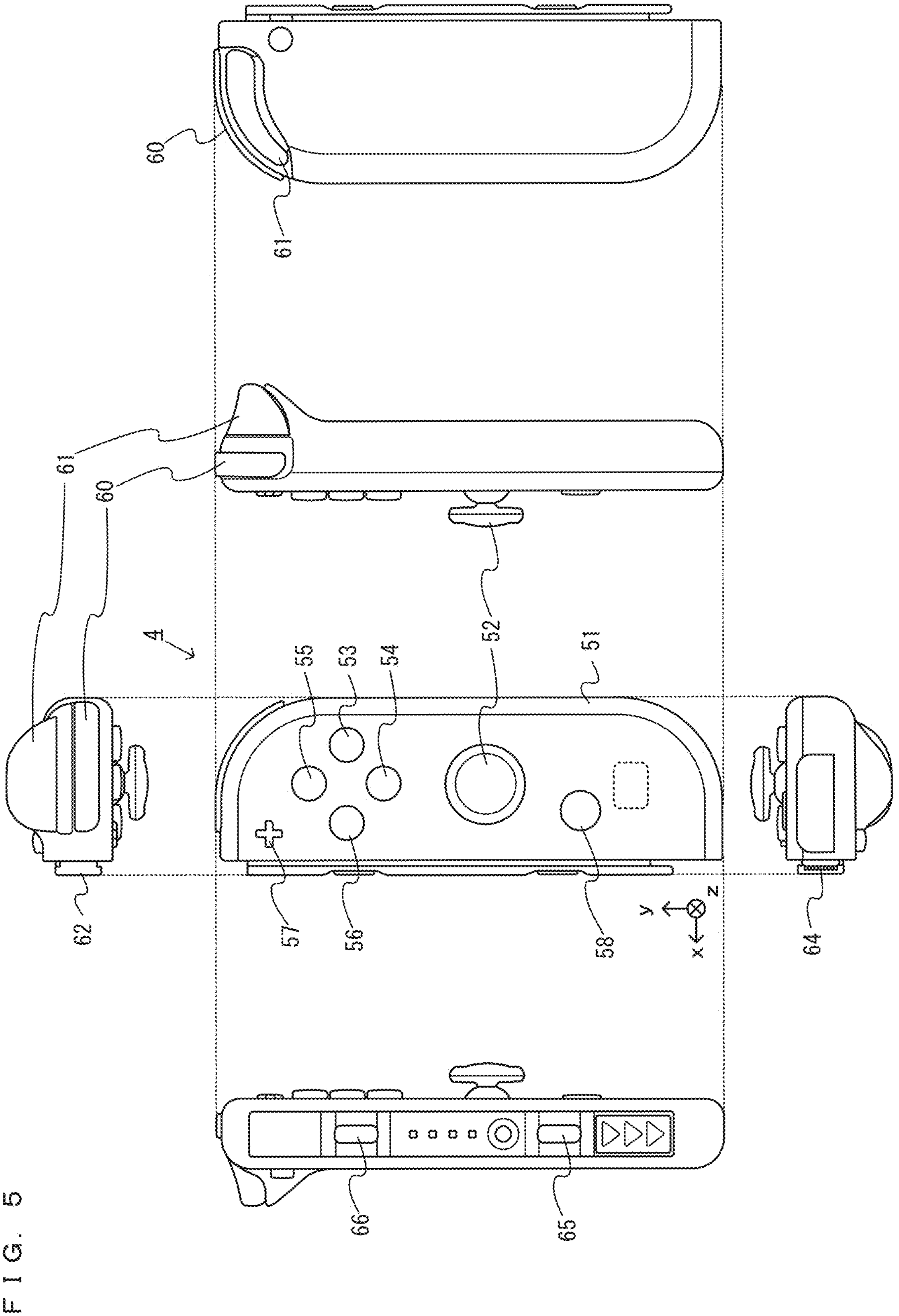
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state in which the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
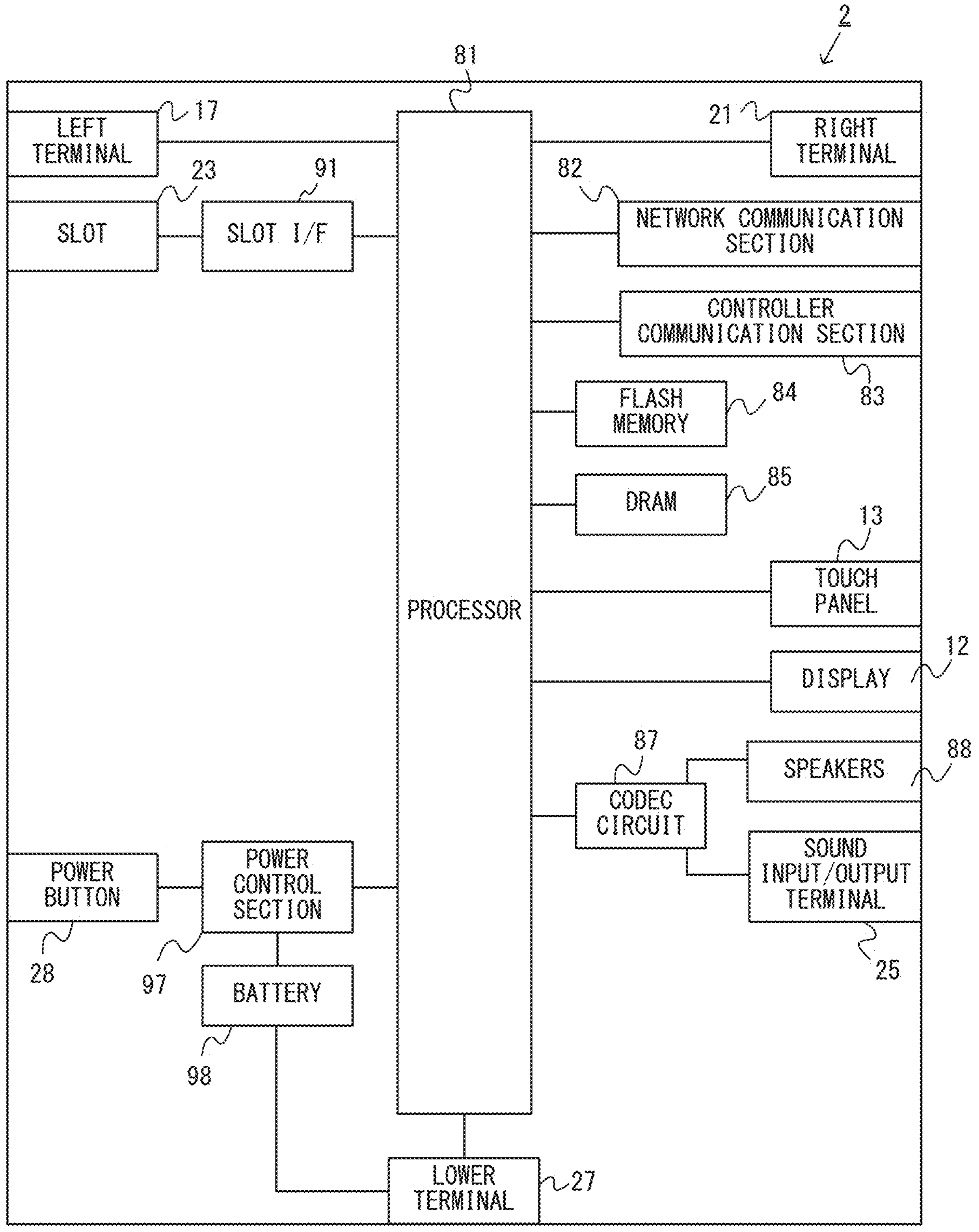
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
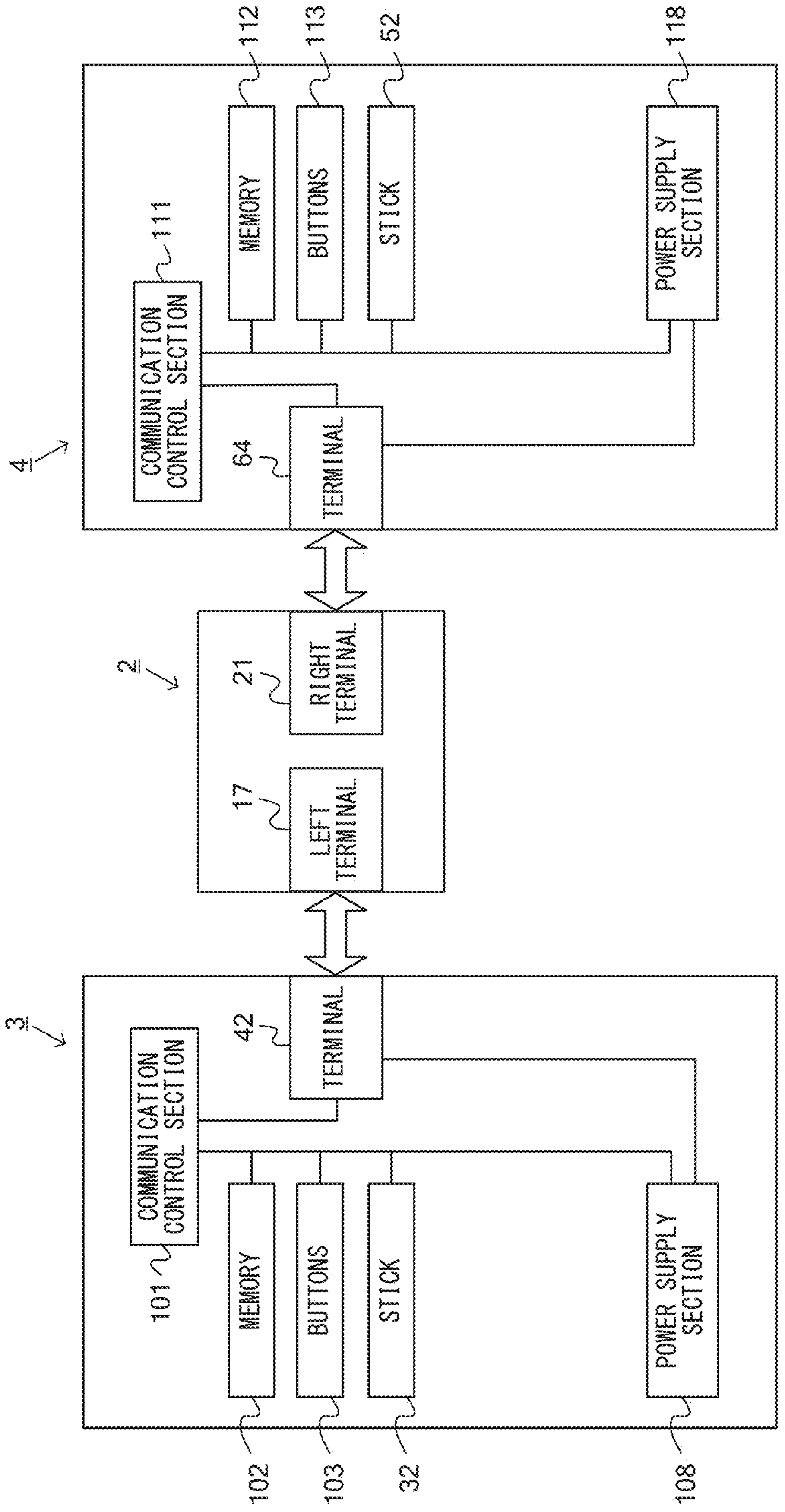
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 obtains information regarding an input (specifically, information regarding an operation or the detection result of the sensor) from each of input sections (specifically, the buttons 103 and the analog stick 32). The communication control section 101 transmits operation data including the obtained information (or information obtained by performing predetermined processing on the obtained information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played using a player character PC that performs an action in a virtual space according to the user's operation performed using the operation buttons, the sticks, and the touch panel 13.

Next, a game process that is executed in the game system 1 will be outlined with reference to FIGS. 8 to 18. In the present example, a predetermined movement scene (long distance movement scene) is performed in a loading screen that is displayed when a long distance movement that causes a player character PC's location to move from a departure point to a destination is performed. For example, in the present example, the player character PC is controlled in a game field (hereinafter simply referred to as a "field") that is a three-dimensional virtual space, based on the user's operation input. When a destination that is away from the player character PC's location (departure point) is designated based on the user's operation input, the player character PC can perform a long distance movement such as warp drive that allows the player character PC's location to move. In the present example, when a command to perform a long distance movement that causes the player character PC's location to move from the departure point to the destination is given, at least a portion of a game process is interrupted, a waiting period until the interrupted game process is resumed is started, and a predetermined long distance movement scene is performed until the end of the waiting period. For example, the waiting period is a loading period during which a process of reading out data of a field of the destination is executed. The long distance movement scene is performed in a loading screen that is displayed during the waiting period. For example, in the long distance movement scene, at least a map image of the departure point showing field information of the departure point and its surroundings and a map image of the destination showing field information of the destination and its surroundings, which is displayed after the map image of the departure point is displayed, are at least displayed.

In the present example, the game system 1 executes a game in which the player character PC, which can be operated by the user of the game system 1, moves in a field. The game system 1 can display a field image showing a field in which the player character PC is disposed, and in addition, a map image (field map image) showing a map of the field. In the present example, the map image may be displayed in place of the field image based on the user's command, and in addition, at least a portion of the map image may invariably be displayed together with the field image.

In the present example, for the sake of convenience, a field of at least a predetermined height in the virtual space is referred to as an airspace field, a field between a ground and the predetermined height (not inclusive) in the virtual space is referred to as a ground field, and a field under the ground is referred to as an underground field. In the present example, all or a portion of the ground field is represented by a ground map, all or a portion of the airspace field is represented by an airspace map, and all or a portion of the underground field is represented by an underground map. The ground field, airspace field, and underground field may not actually be demarcated in the virtual space. The player character PC can at least move in the ground field, airspace field, and underground field of the virtual space based on the user's movement operation.

Next, an example of a method of giving a command to perform a long distance movement in the present example will be described with reference to FIG. 8. It should be noted that FIG. 8 is a diagram illustrating an example of a method of giving a command to perform a long distance movement in the present example.

In the present example, the player character PC can perform a long distance movement in which the player character PC's location is moved to a destination designated based on the user's operation input. Here, the destination is a location that is away from a departure point that is the player character PC's location at the current time. The destination may be a location that is far away from the departure point in the virtual space (e.g., a location out of a display range in a map image including a departure point described above), a location that is very close to the departure point in the virtual space, a location that is in a field other than the field of the departure point, or a location that is in a specific space provided in the virtual space. The movement of a location from a departure point to a destination is an instantaneous movement from the departure point to the destination, but not a typical continuous movement including a movement action along a movement path from the departure point to the destination. It should be noted that in the movement of a location from a departure point to a destination, the location may be instantaneously moved from the departure point to the destination, or it may take a predetermined time to move from the departure point to the destination. For example, the movement of a location from a departure point to a destination includes at least fast travel, warp drive, instantaneous movement, and the like.

Figure 8:
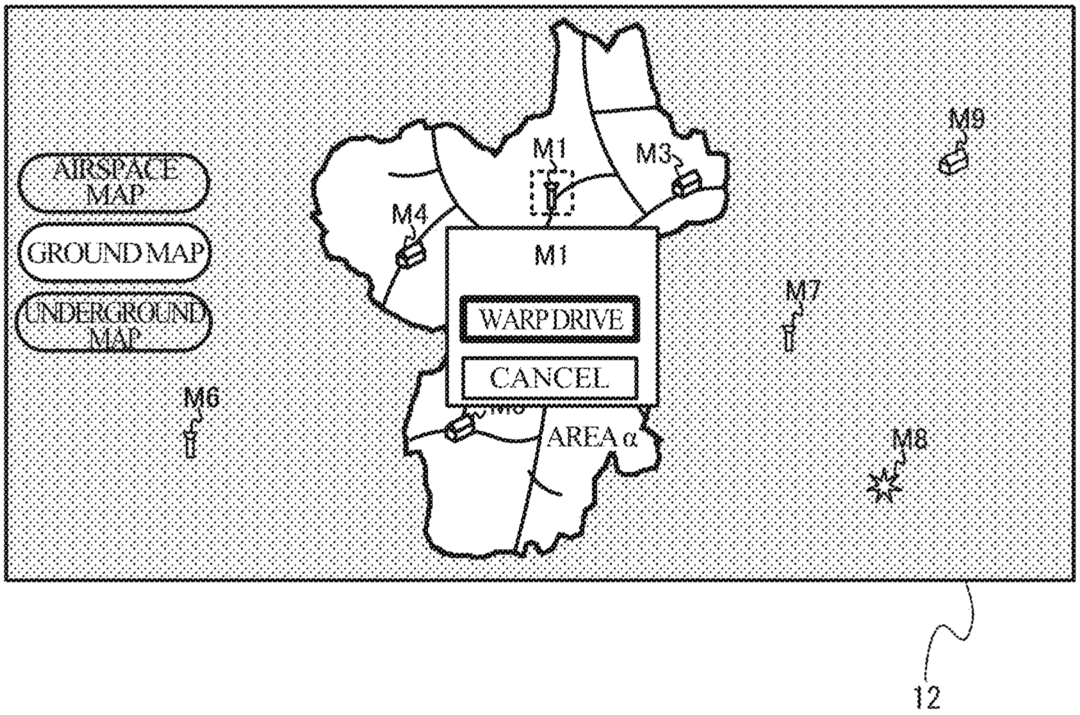
FIG. 8 is a diagram illustrating a non-limiting example of a method of giving a command to perform a long distance movement in the present example.

As illustrated in FIG. 8, in the present example, the process mode can be switched according to the user's operation input between a field mode in which a field image is displayed and a map display mode in which a map image (field map image) is displayed, as described below. For example, built structures and the like, and built structures and the like that the player character PC has once visited, in a map image displayed in the map display mode, can be designated as the destination of a long distance movement based on the user's command operation input. For example, in the example of FIG. 8, a built structure M1 that is disposed in an area α in a ground map image that is being displayed is designated as the destination. In the present example, a map image can be scrolled and displayed, and fields shown by a map image can be switched, based on the user's operation input. The user can designate a location in a map image being displayed as the destination of a long distance movement. It should be noted that a map image that is displayed is described below.

When the destination is designated and a long distance movement is started, the player character PC's location is automatically moved from a current location (departure point) that is the player character PC's location at the current time to the destination or its surroundings (i.e., even without the user's operation input for moving the player character PC).

In the present example, when a command to perform a long distance movement in which the player character PC's location is moved from the departure point to the destination is given, at least a portion of game process is interrupted, a waiting period is started, and a predetermined movement scene (long distance movement scene) is displayed until the end of the waiting period. For example, the waiting period is a loading period during which a process of reading out data of a field of the destination is executed, and at least a portion of a game process is interrupted during execution of the loading process. In the present example, examples of a portion of the game process that is interrupted during the waiting period include a process of controlling the player character PC's action according to the user's operation input, a process of causing other characters and objects to perform an action in the virtual space, and a process of causing a game time in a game that is being executed to elapse, and updating the virtual space. Examples of a portion of a game process that is not interrupted during the waiting period include a process for performing the long distance movement scene and a loading process of reading out and storing data. In the present example, the long distance movement scene is performed, being accompanied by map display, in the loading screen displayed during the loading period.

Figure 9:
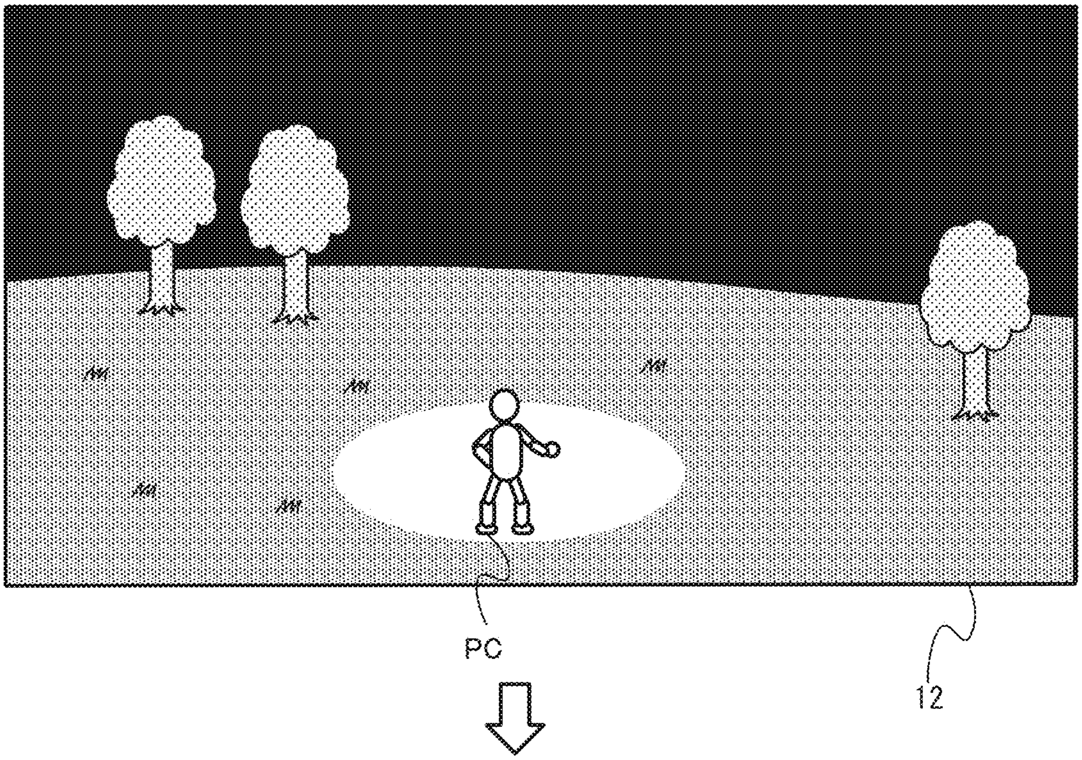
FIG. 9 is a diagram illustrating a non-limiting example of a game image that is displayed in a first stage of a long distance movement scene in the present example.
Figure 9:
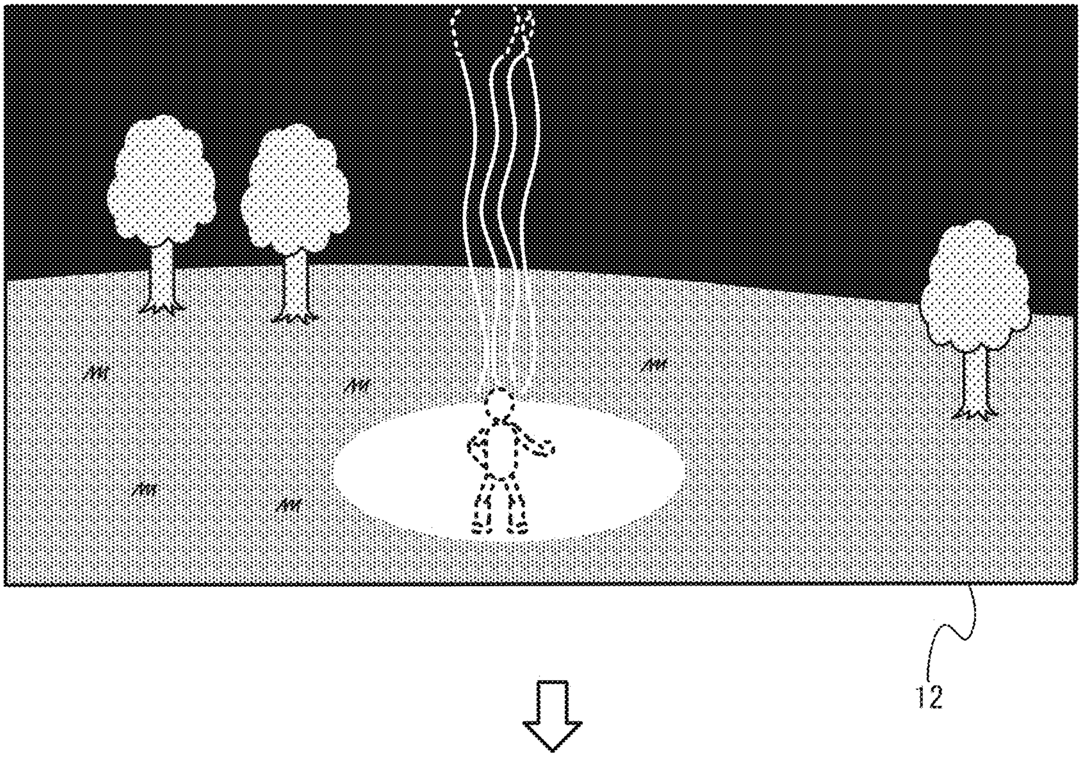
Figure 10:
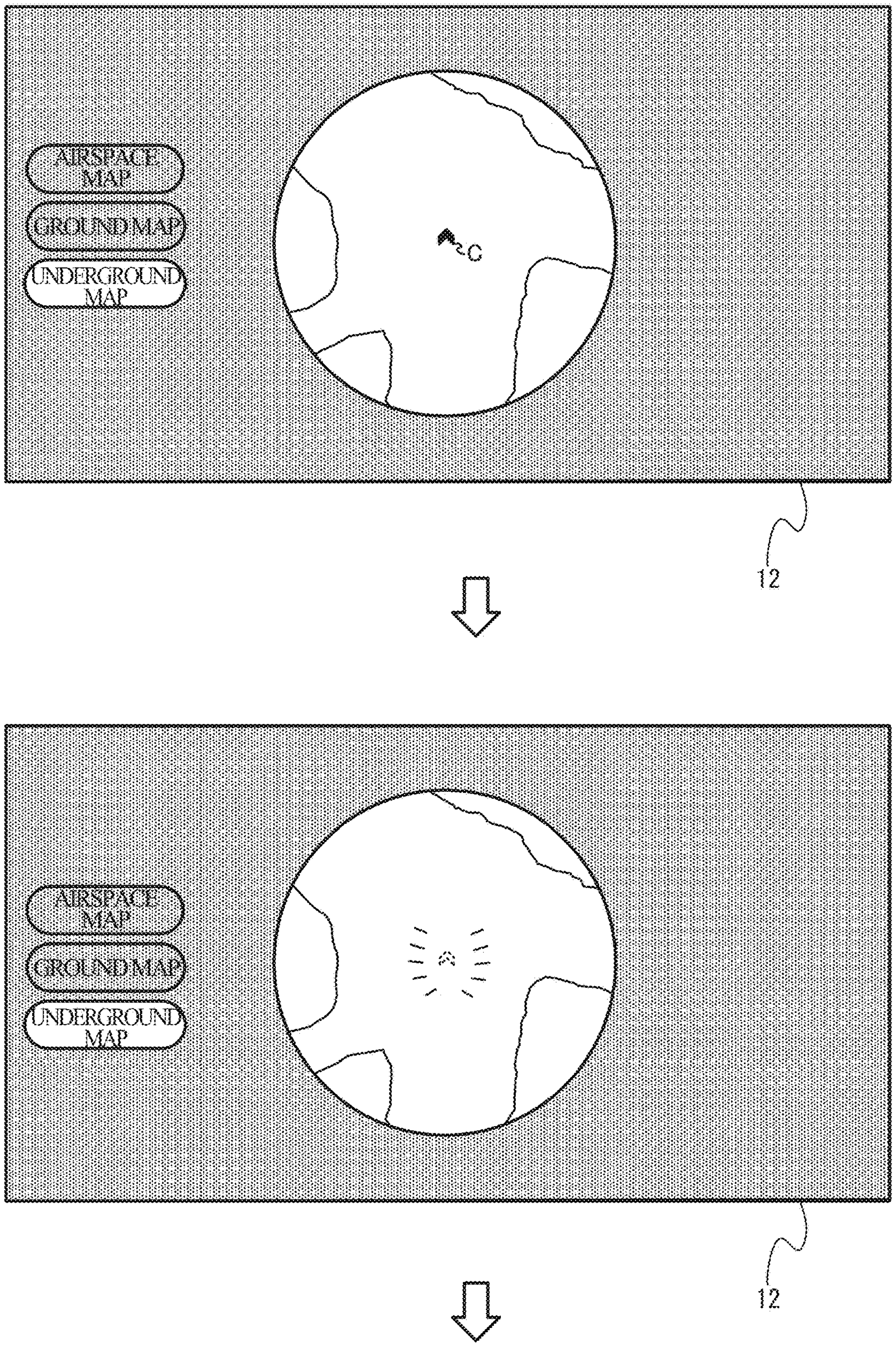
FIG. 10 is a diagram illustrating a non-limiting example of a game image that is displayed in a second stage of a long distance movement scene in the present example.
Figure 11:
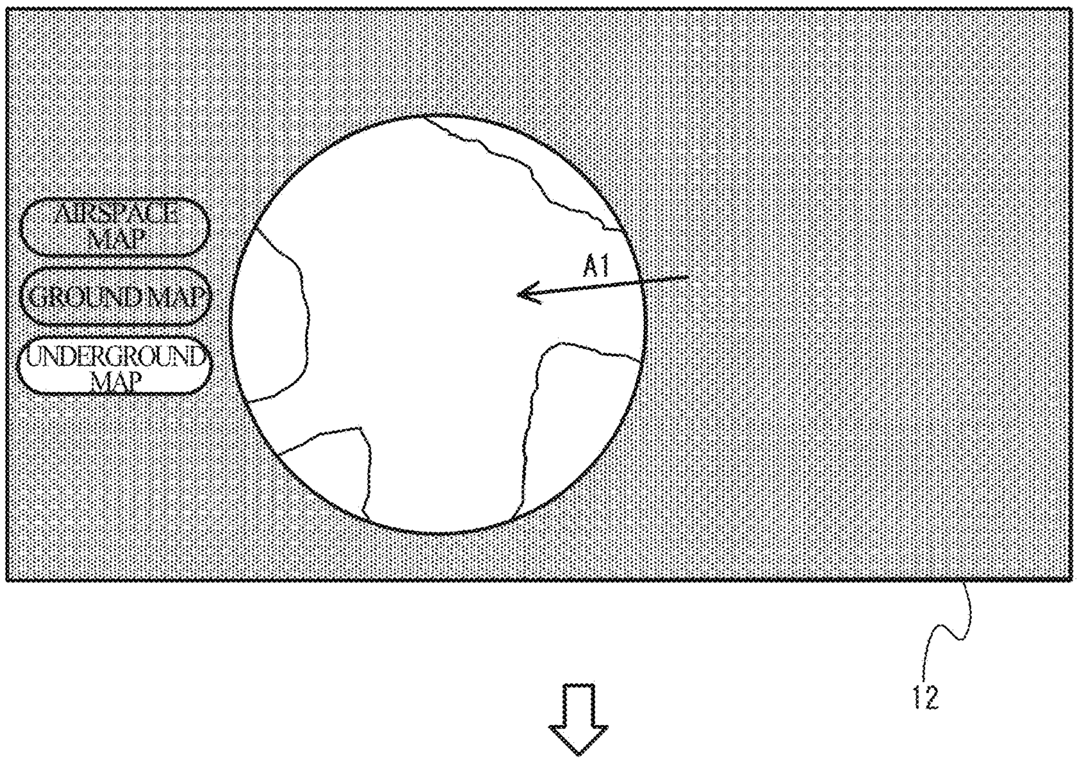
FIG. 11 is a diagram illustrating a non-limiting example of a game image that is displayed in a third stage of a long distance movement scene in the present example.
Figure 11:
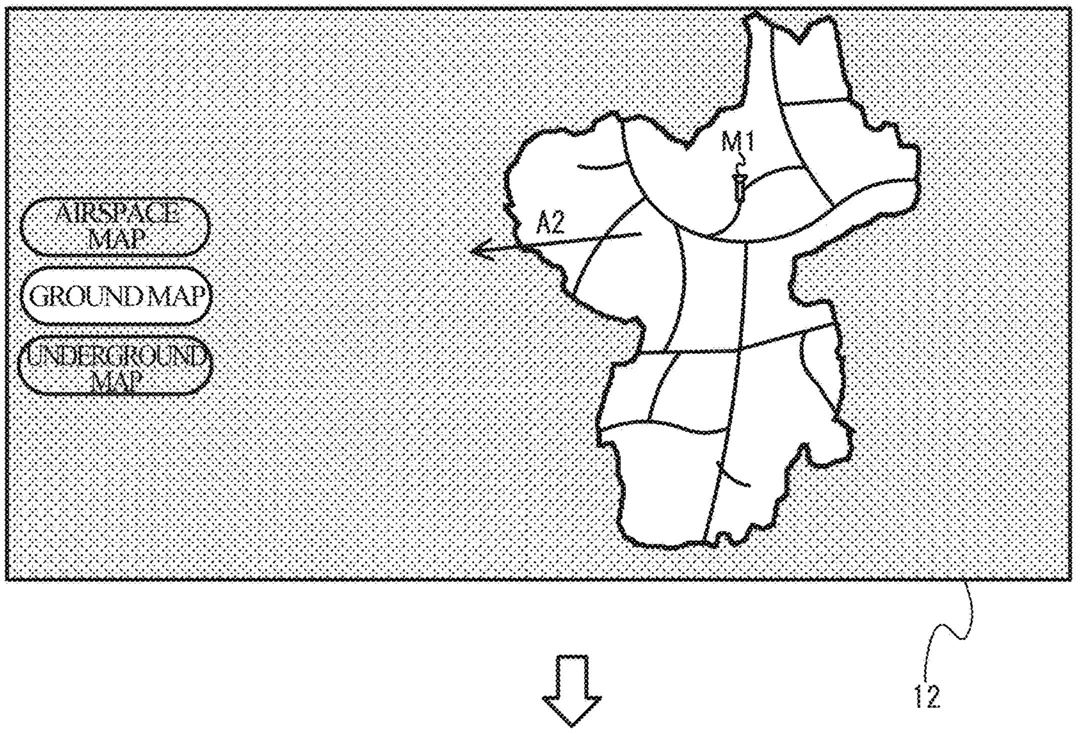
Figure 12:
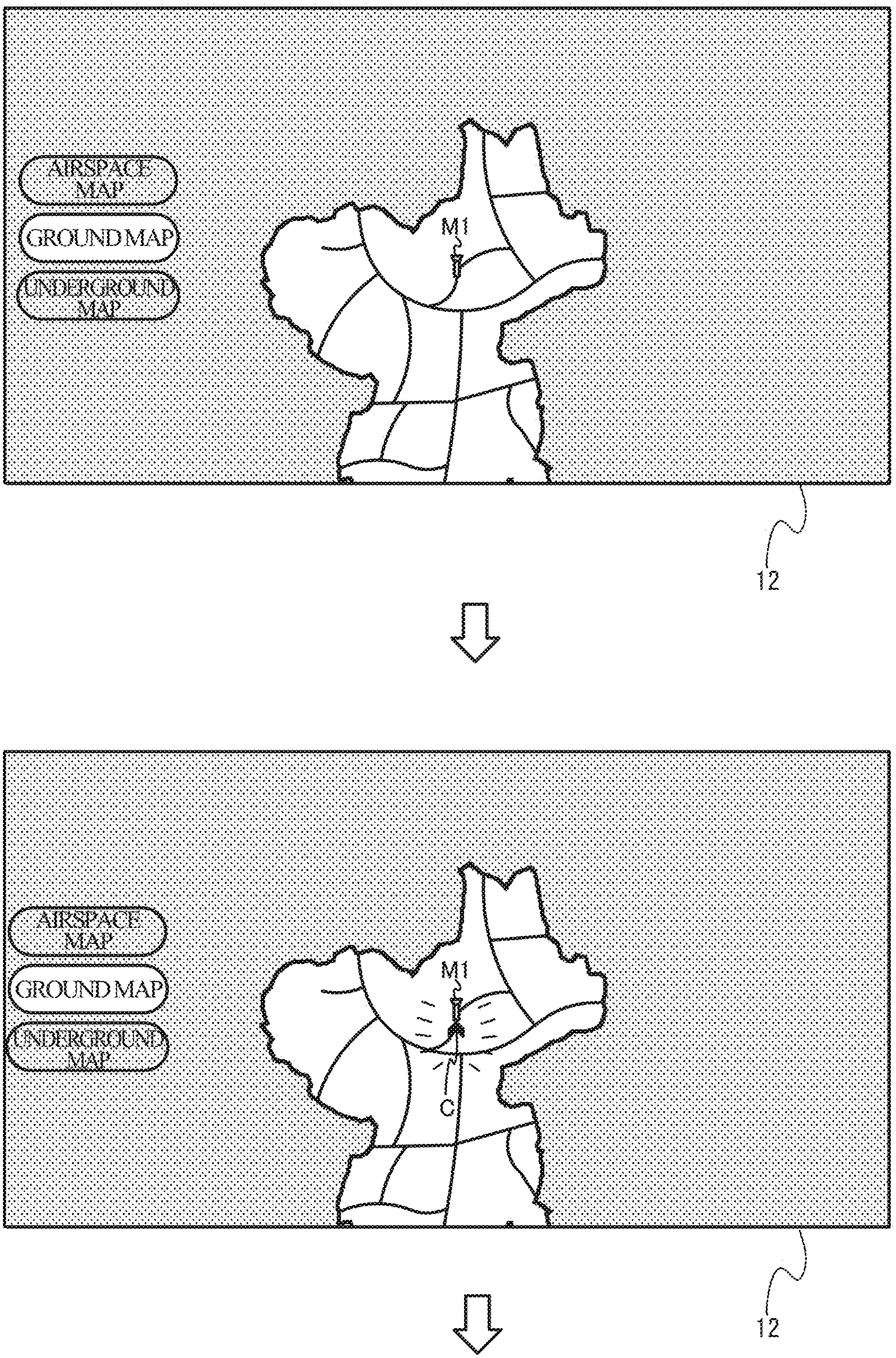
FIG. 12 is a diagram illustrating a non-limiting example of a game image that is displayed in a fourth stage of a long distance movement scene in the present example.
Figure 13:
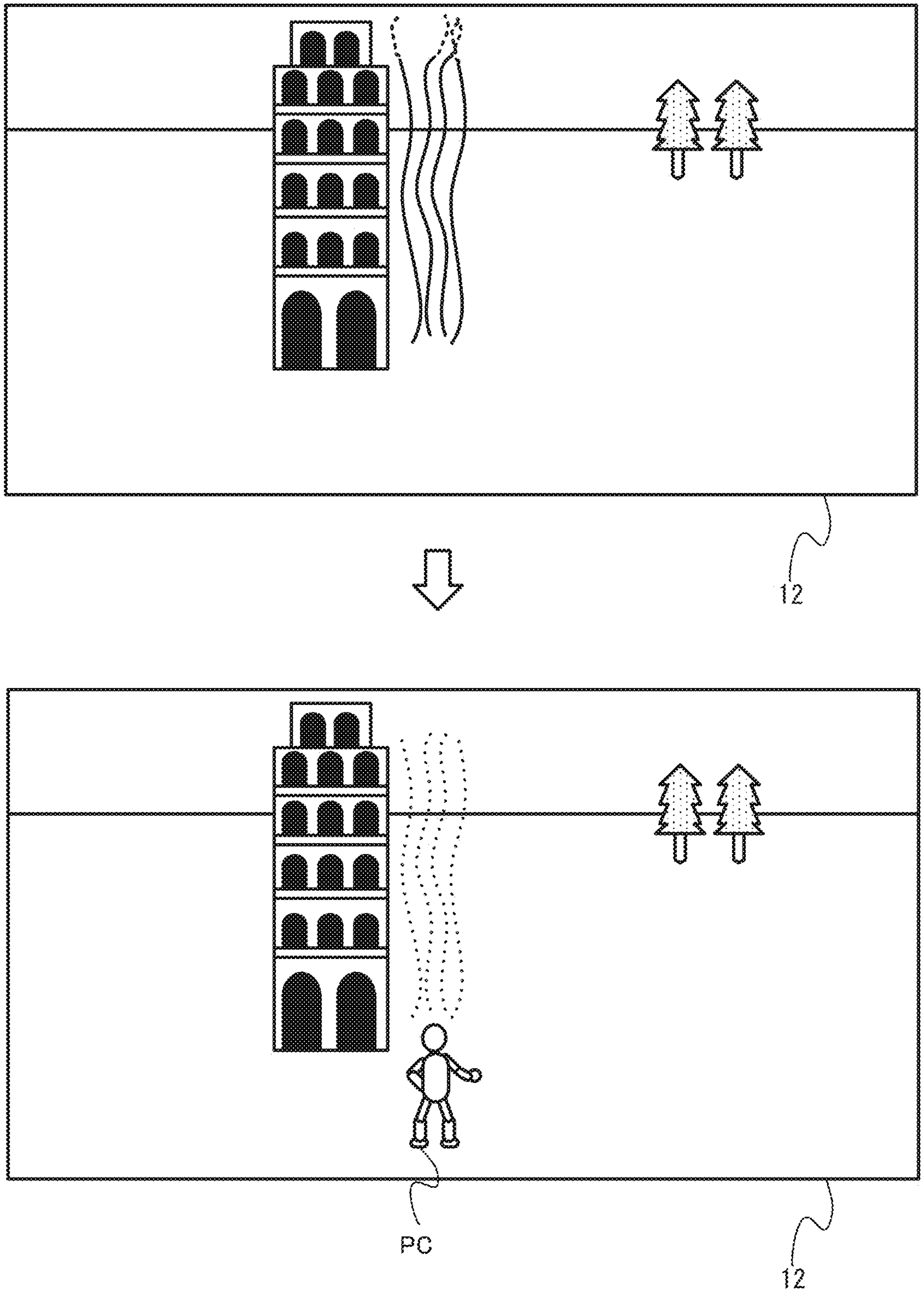
FIG. 13 is a diagram illustrating a non-limiting example of a game image that is displayed in a fifth stage of a long distance movement scene in the present example.

Next, an example of the long distance movement scene performed during the waiting period will be described with reference to FIGS. 9 to 13. It should be noted that FIG. 9 is a diagram illustrating an example of a game image that is displayed in a first stage of the long distance movement scene in the present example. FIG. 10 is a diagram illustrating an example of a game image that is displayed in a second stage of the long distance movement scene in the present example. FIG. 11 is a diagram illustrating an example of a game image that is displayed in a third stage of the long distance movement scene in the present example. FIG. 12 is a diagram illustrating an example of a game image that is displayed in a fourth stage of the long distance movement scene in the present example. FIG. 13 is a diagram illustrating an example of a game image that is displayed in a fifth stage of the long distance movement scene in the present example. In an example of the long distance movement scene described below, the player character PC performs a long distance movement from a departure point in the underground field to a destination in the ground field.

When a command to perform a long distance movement that moves the player character PC's location from the departure point to the destination is given, a state in which a map image showing the designated destination is displayed (see FIG. 8) is changed to a state in which a virtual space image is displayed, in the first stage of the long distance movement scene that is displayed during the waiting period. In an example illustrated in an upper portion of FIG. 9, a game image in which the player character PC is disposed at the departure point in the underground field of the virtual space is displayed, indicating a state before the player character PC's long distance movement.

Next, as illustrated in a lower portion of FIG. 9, an animation is displayed in which the player character PC, which is disposed at the departure point in the virtual space, starts a long distance movement by starting warp drive from the location of the departure point. It should be noted that the player character PC, which is indicated by a dashed line in the lower portion of FIG. 9, is in a state in which the player character PC has disappeared and has started a long distance movement from the departure point in the virtual space.

In the next stage of the long distance movement scene displayed during the waiting period, as illustrated in an upper portion of FIG. 10 a map image showing field information of the departure point and its surroundings is displayed. For example, in an example illustrated in the upper portion of FIG. 10, an underground map image showing the underground field around the departure point is displayed. In addition, an icon image of a current location C indicating that the player character PC is disposed at the location of the departure point in the displayed underground map image is displayed.

Next, as illustrated in a lower portion of FIG. 10, the icon image of the current location C is deleted from the map image with predetermined timing after the map image showing field information of the departure point and its surroundings is displayed, and the map image continues to be displayed. As a result, the location on the map image of the player character PC at the departure point in the long distance movement, and the start of the player character PC's long distance movement, can be intuitively recognized by the user.

Next, as illustrated in an upper portion of FIG. 11, a map image that is being displayed is slid and displayed in a direction (a direction A1 in the upper portion of FIG. 11) opposite to the player character PC's movement direction in the map image from the departure point to the destination in the long distance movement. Here, when a long distance movement is performed between different fields, the player character PC's movement is a three-dimensional movement between fields, but not a two-dimensional movement along a field surface. Even in the case in which the player character PC's movement is such a three-dimensional movement, the slide direction in the map image in the present example is determined after the three-dimensional movement is replaced by a two-dimensional movement as viewed from above in the virtual space. As a result, a direction in a map image in which the player character PC's location is moved from a departure point in a long distance movement can be intuitively recognized by the user.

In the next stage of the long distance movement scene displayed during the waiting period, as illustrated in a lower portion of FIG. 11 a map image showing field information of the destination and its surroundings is displayed. For example, in an example illustrated in the lower portion of FIG. 11, an underground map image of the ground field around the destination (e.g., a built structure M1) is displayed. It should be noted that at this time, an icon image of a current location C indicating that the player character PC is disposed at the current location C is not displayed at the location of the destination in the displayed ground map image. In addition, a map image that is being displayed is slid and displayed in a direction (a direction A2 in the lower portion of FIG. 11) opposite to the player character PC's movement direction in the map image toward the destination in the long distance movement, so that the map image around the destination is finally displayed after the sliding.

As a result, a direction in a map image in which the player character PC's location is moved to a destination in a long distance movement can be intuitively recognized by the user.

Next, as illustrated in an upper portion of FIG. 12, the sliding of the map image ends, and a map image showing field information of the destination and its surroundings is displayed. For example, in an example illustrated in the upper portion of FIG. 12, a ground map image of the ground field around the destination (built structure M1) is displayed. It should be noted that even at this time, an icon image of a current location C indicating that the player character PC is disposed at the current location C is not displayed at the location of the destination in the displayed ground map image.

Next, with predetermined timing after the map image around the destination is displayed, an icon image of a current location C indicating that the player character PC is disposed at the current location C is displayed at the location of the destination of the displayed map image. As a result, the location in the map image of the player character PC at the destination in the long distance movement, and the end of the player character PC's long distance movement, can be intuitively recognized by the user.

In the next stage of the long distance movement scene displayed during the waiting period, a state in which the map image around the destination is displayed (see the lower portion of FIG. 12) is changed to a state in which a virtual space image is displayed. In an example illustrated in an upper portion of FIG. 13, an animation is displayed in which the player character PC has finished warp drive, i.e., the long distance movement, at the destination in the vicinity of the built structure in the ground field of the virtual space.

Next, a virtual space image in which the player character PC, which has finished warp drive, is disposed at the location of the destination in the virtual space is displayed. In an example illustrated in a lower portion of FIG. 13, a game image in which the player character PC is disposed at the destination in the ground field of the virtual space is displayed as a state of the player character PC after the long distance movement.

The timing with which each stage of the long distance movement scene is performed may be controlled based on an elapsed time and/or the progression of loading. For example, in the long distance movement scene, a map image showing field information of a departure point and its surroundings is displayed during at least a first period of time, and after the end of the first period of time, a map image showing field information of a destination and its surroundings may start to be displayed when a second period of time has elapsed or the progression of loading has reached a predetermined level. As a result, at least a predetermined period of time for displaying a map image showing at least field information of a departure point and its surroundings is allocated, and a map image showing field information of a destination and its surroundings starts to be displayed after the lapse of the second period of time or the progression of loading, which is the earlier. Therefore, destination information, which is more important, can be displayed earlier during the waiting period. As an example, when at least 1 second has elapsed and at least 3 seconds have elapsed or the progression of loading has exceeded 20% since displaying of a map image showing field information of a departure point and its surroundings, a map image showing field information of a destination and its surroundings may start to be displayed. As a result, at least 1 second is allocated for displaying a map image showing field information of a departure point and its surroundings in a long distance movement, and therefore, the map image in which the player character PC is disposed before the long distance movement can be prevented from being overlooked. In addition, a map image showing field information of a destination and its surroundings is displayed when at least 3 seconds have elapsed or the progression of loading has exceeded 20%, and therefore, the map image around the destination after the long distance movement, which is more important, can be displayed for a longer time.

It should be noted that the timing with which each stage of the long distance movement scene controlled based on an elapsed time and/or the progression of loading is not limited to timing with which displaying of a map image is started and ended, and may be timing with which other scenes are performed or ended. For example, timing with which an animation in which the player character PC starts warp drive is started and ended, timing with which an icon image indicating a current location C disappears and appears, timing with which an animation in which the player character PC finishes warp drive is started and ended, and the like may be controlled based on the elapsed time and/or the progression of loading.

In addition, the elapsed time may start to be measured when a map image showing field information of a departure point and its surroundings is displayed, or in addition, when the long distance movement scene is started (i.e., an animation in which the player character PC starts warp drive from the location of a departure point is started), when an icon image of a current location C indicating a departure point is deleted, or the like.

In addition, the waiting period may be longer than the loading period during which a process of reading out data of a field of a destination is executed. For example, even when the loading period ends earlier, the waiting period may be continued as a period of time during which the long distance movement scene is performed or other processes are executed after the end of the loading period.

In addition, the long distance movement scene displayed during the waiting period may exclude the above-mentioned portion of the scene, or may additionally include other scenes. For example, the long distance movement scene may exclude a scene in which a game image is slid and displayed, a scene in which an icon image indicating a current location C disappears or appears, or a scene in which the player character PC starts or finishes warp drive. In addition, the long distance movement scene may be performed based on the user's operation input. As an example, tips such as hints, tricks, and advices for a game, which are presented to the user, may be displayed, overlaying a game image displayed during performance of the long distance movement scene, and the details of the tips may be updated based on the user's operation input and displayed, overlaying the game image.

In addition, in the long distance movement of the present example, the field of a departure point and the field of a destination may be the same or different. In the latter case, the field of a departure point may be adjacent to the field of a destination, or may not be adjacent to the field of a destination (e.g., a long distance movement from the airspace field to the underground field).

In addition, the present example is not limited to the above three layers of fields, i.e., the ground field, airspace field, and underground field, and the player character PC may be able to move in at least four layers of fields or at most two layers of fields. Instead of the above ground field, airspace field, and underground field, the virtual space may include a plurality of layers of fields having different forms.

As a first example, the ground field in the present example may include a sea surface field that is an area of a sea surface. The virtual space may include at least two layers of fields including the sea surface field and the airspace field. As a second example, the airspace field in the present example may include outer space (the area beyond the Earth's atmosphere) in the virtual space. The virtual space may include at least two layers of fields including the ground field and the airspace field including outer space. As a third example, the virtual space may include at least an undersea field that is an area below a sea surface and a sea surface field that is an area of the sea surface. As a fourth example, the virtual space may include an airspace field that is separated into a lower airspace field and a higher airspace field. Thus, even in a game that uses a virtual space including fields having various forms, a map image and a long distance movement scene in a long distance movement can be displayed and performed in a manner similar to that described above.

Next, a map image used in the present example will be described with reference to FIGS. 14 to 18. In the present example, in a map image, an area where field information thereof is locked and an area where field information thereof is unlocked are set and displayed in different forms. For example, the field information relates to a field in the virtual space, including information about a terrain forming the field (specifically, a shape and the like of the terrain), information about an object provided in the field, information about an item disposed in the field, information about a character present in the field, and the like. An area before field information in a map image is unlocked is displayed in a form in which the field information in the area is not shown. For example, when the player character PC performs a predetermined action at a specific location in the virtual space, field information of a map image in an area around the specific location is unlocked.

A game process that is executed when field information of a map image is unlocked will be described with reference to FIG. 14. It should be noted that FIG. 14 is a diagram illustrating an example of a game image that is displayed when a process of unlocking field information of a map image is executed.

Figure 14:
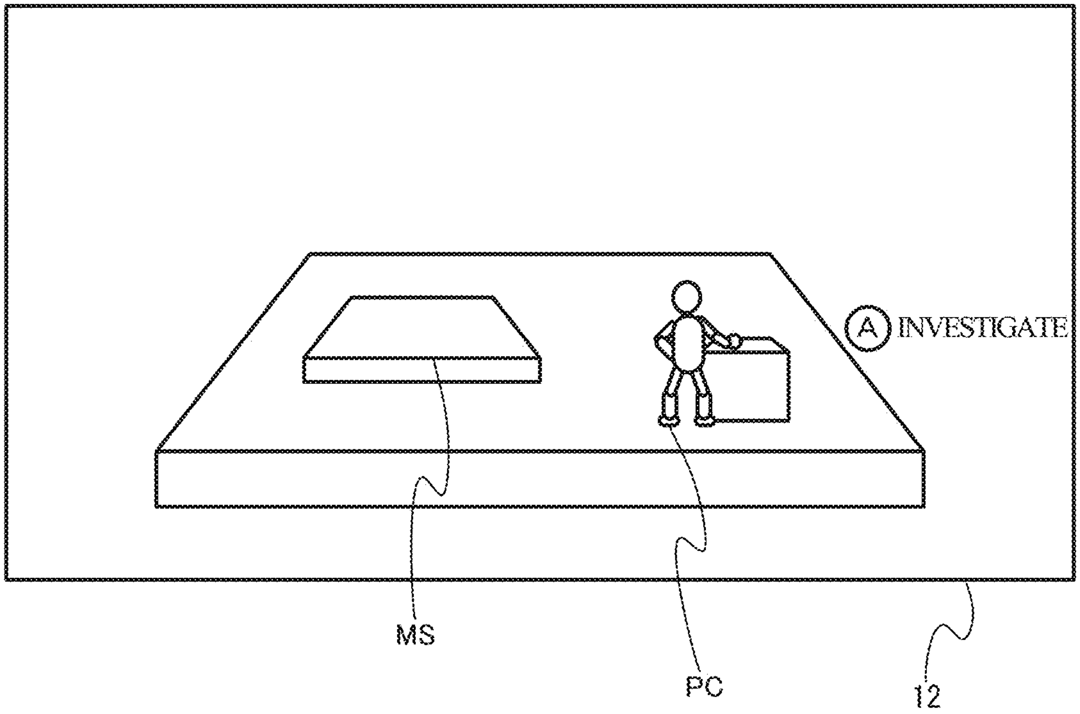
FIG. 14 is a diagram illustrating a non-limiting example of a game image that is displayed when a process of unlocking field information of a map image is executed.

In FIG. 14, an image in which the player character PC is located at a specific location in the virtual space is displayed. Here, in the present example, a plurality of specific locations are set in a field. When the player character PC is located at or near a specific location, then if the user performs a predetermined operation input (e.g., the user's operation input for causing the player character PC to perform the action of investigating a specific location), field information of an area around the specific location is unlocked. Specifically, when the player character PC reaches a specific location and performs a predetermined action (e.g., the action of investigating a specific location and its surroundings), a map image in which field information of an area around the specific location is unlocked can be displayed. In the present example, when the player character PC performs a predetermined action at a specific location, an unlock event in which field information of an area around the specific location is unlocked is performed. As an example, the unlock event is a scene indicating that field information of an area to be unlocked is unlocked. After a map image in which field information of an area to be unlocked is locked is displayed, and a map image in which field information of an area to be unlocked is unlocked is displayed, whereby a scene notifying the user that field information of an area to be unlocked is unlocked is performed. It should be noted that the specific location may, for example, be a place that the player character PC can designate as a departure point and/or a destination of a long distance movement, a place where the player character PC can be recovered, or a place where the player character PC's equipment, skill, and carried item can be changed.

In a map image of each field, a plurality of areas are provided. It should be noted that the areas may be previously formed by dividing a field, or may be formed in a shape that depends on the player character PC's unlocking action (e.g., a circular shape having a size depending on an action) each time such an action is performed. A map image includes, for each area, a first-state map image that includes predetermined field information (e.g., a map image of an area where detailed field information is displayed) or a second-state map image that does not include the predetermined field information (e.g., a map image of an area where detailed field information is not displayed). When the player character PC performs the action of unlocking field information, the map image of an area where the action is performed can be changed from the second state to the first state. A map image before field information of an area is not unlocked is displayed in a form in which at least a portion of the field information is not shown, and another portion of the field information may be displayed before unlocking. Thus, when field information of an area is unlocked, field information of the area in a map image is displayed. As a result, the user easily causes the player character PC to explore an area where field information thereof is unlocked.

Figure 15:
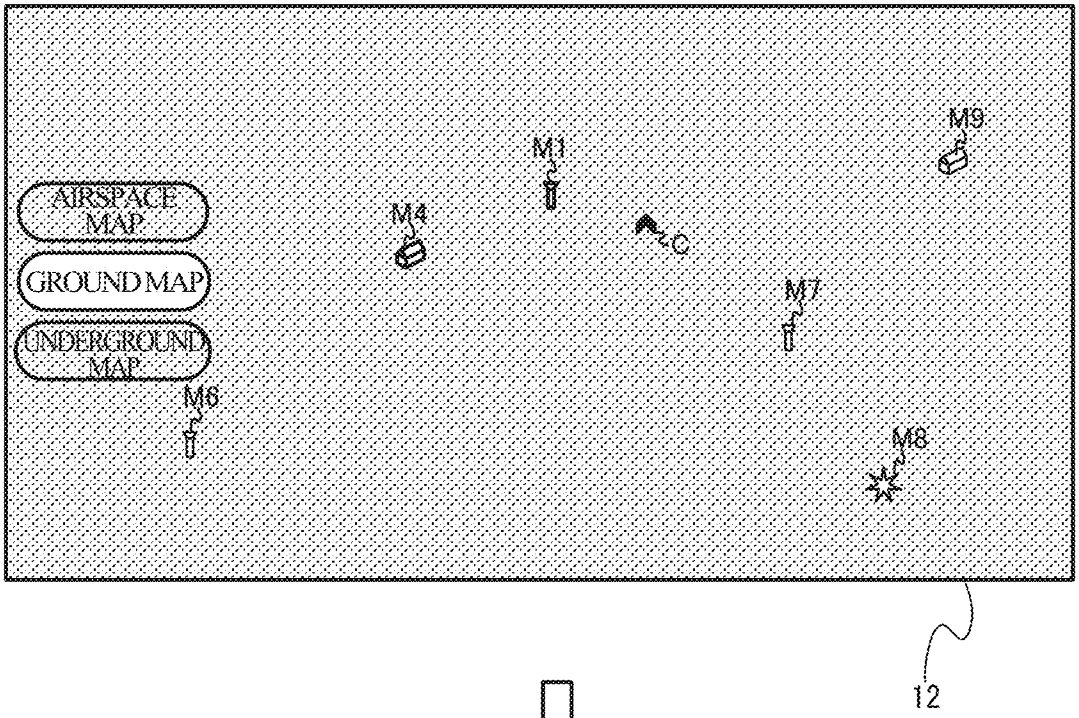
FIG. 15 is a diagram illustrating a non-limiting example of a ground map image in which field information of all areas is locked and a non-limiting example of a ground map image in which field information of an area α is unlocked.
Figure 15:
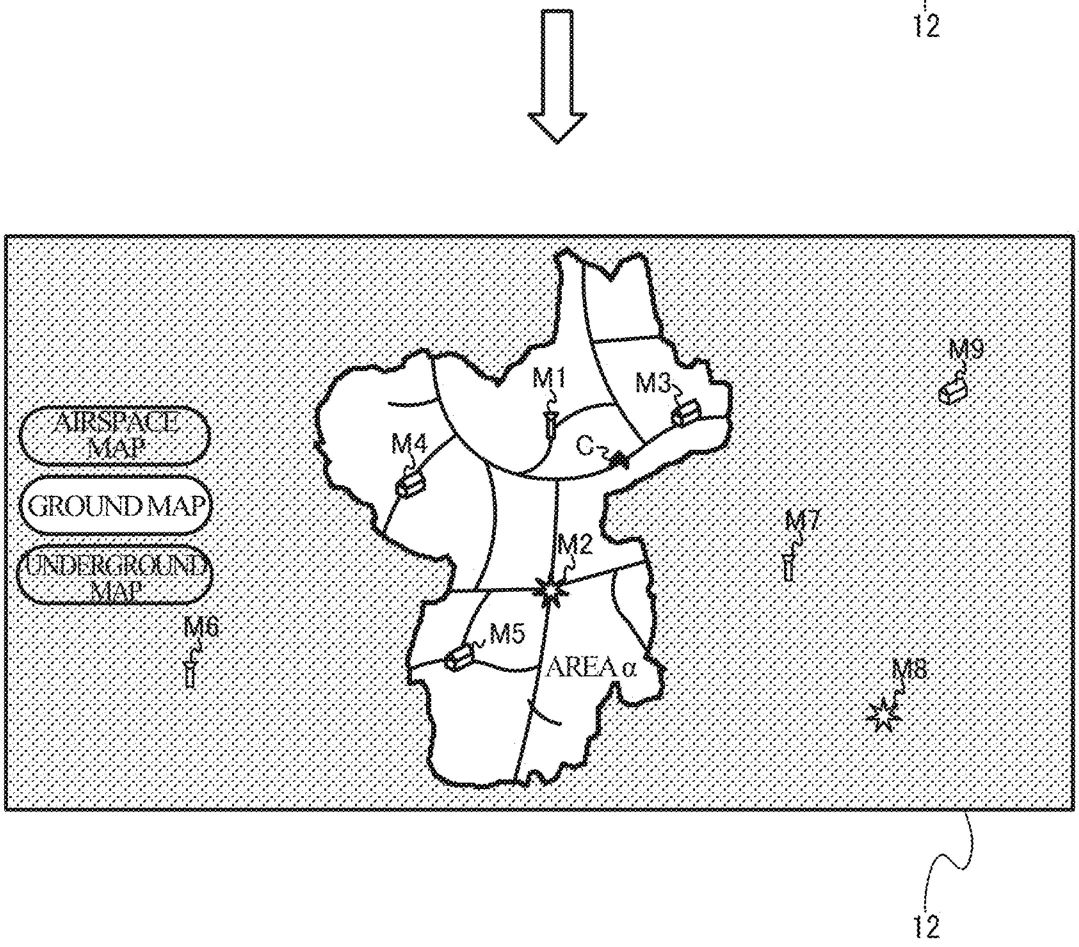
Figure 16:
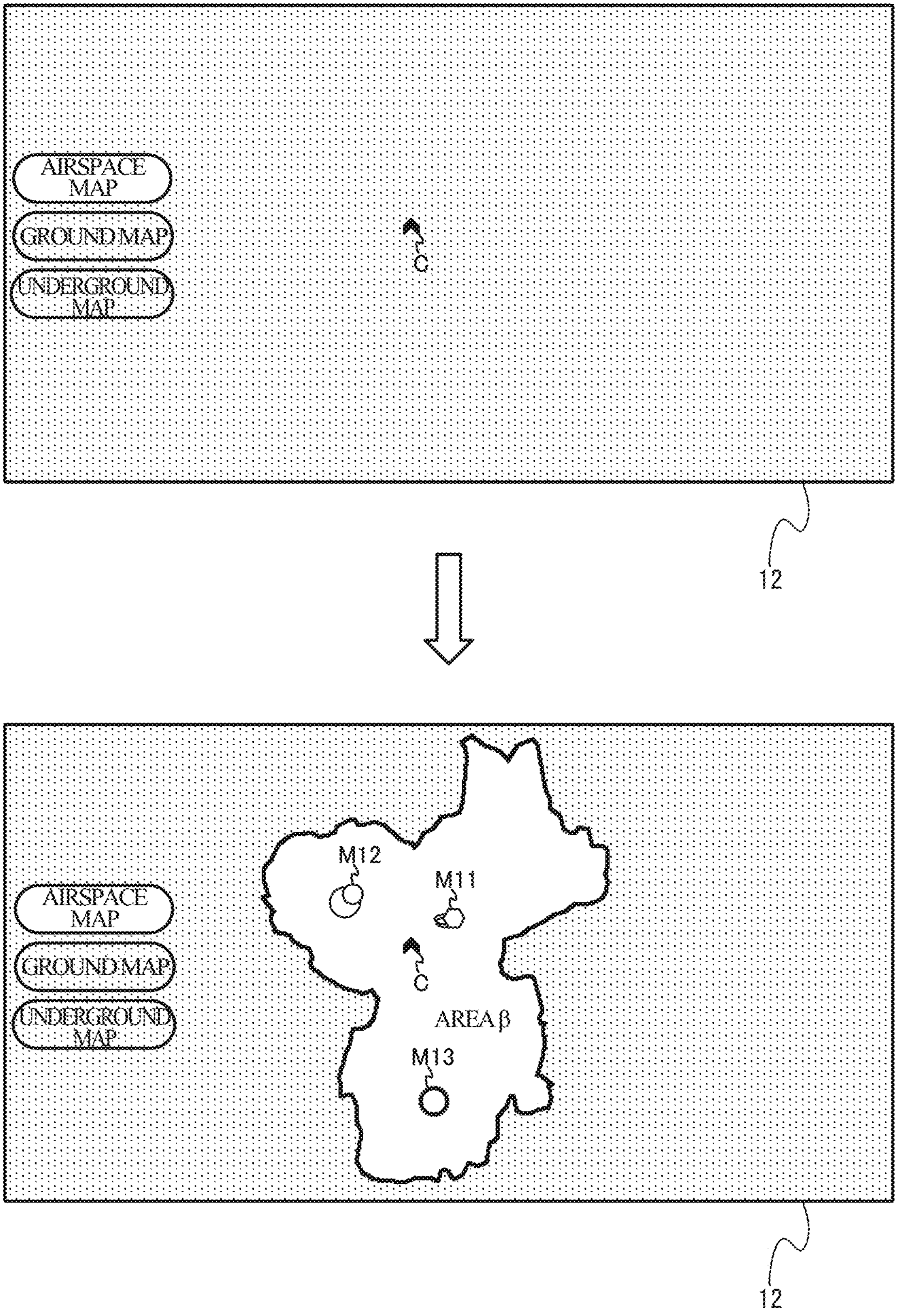
FIG. 16 is a diagram illustrating a non-limiting example of an airspace map image in which field information of all areas is locked and a non-limiting example of an airspace map image in which field information of an area β is unlocked.
Figure 17:
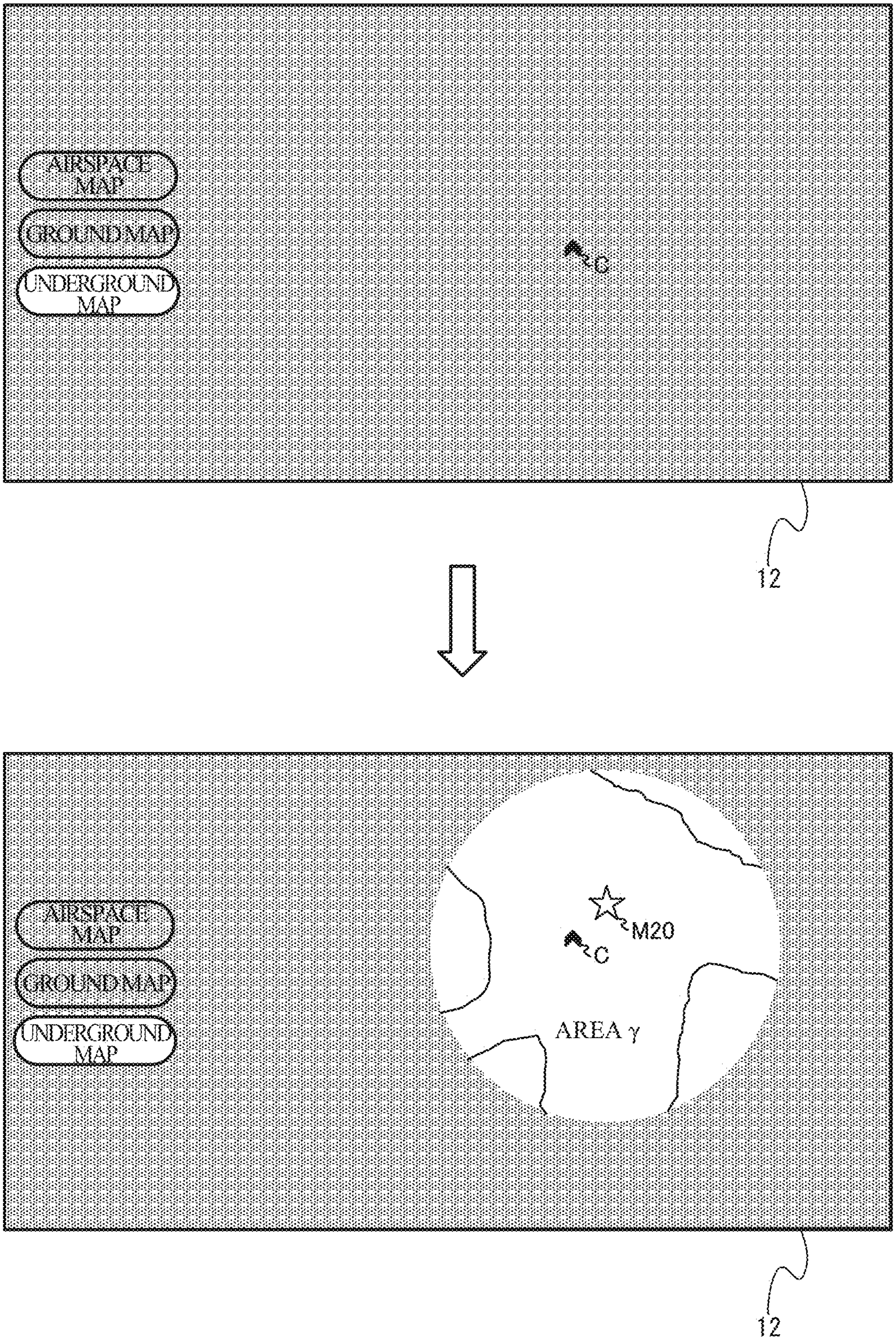
FIG. 17 is a diagram illustrating a non-limiting example of an underground map image in which field information of all areas is locked and a non-limiting example of an underground map image in which field information of an area γ is unlocked.

Next, an example of a change in a map image between before and after field information is unlocked will be described with reference to FIGS. 15 to 17. It should be noted that FIG. 15 is a diagram illustrating an example of a ground map image in which field information of all areas is locked and an example of a ground map image in which field information of an area α is unlocked. FIG. 16 is a diagram illustrating an example of an airspace map image in which field information of all areas is locked and an example of an airspace map image in which field information of an area β is unlocked. FIG. 17 is a diagram illustrating an example of an underground map image in which field information of all areas is locked and an example of an underground map image in which field information of an area γ is unlocked.

In a lower portion of FIG. 15, an example of a ground map image including an area α where field information thereof is unlocked and the other areas where field information thereof is locked is displayed. The area α is one of a plurality of areas into which the ground field is previously divided. Detailed field information is described throughout the area α of the ground map image. For example, detailed field information described in a ground area when field information thereof is unlocked includes terrain information such as the names, shapes, contour lines, and the like of seas, lakes, ponds, rivers, mountains, hills, forests, plains, and the like in the ground area, building/construction information such as the names, shapes, locations, and the like of roads, bridges, built structures, and the like provided in the ground field corresponding to the ground area, and the like. As an example, in the ground map image of FIG. 15, roads and built structures M1 to M5 built in the ground field corresponding to the area are described, and the shapes, types, locations, and the like thereof are indicated. In addition, in the displayed ground map image, a current location C where the player character PC is currently located is displayed. In the other areas of the ground map image, field information thereof is locked, and detailed field information thereof is not described, unlike the area α. In the present example, in a ground area where field information thereof is locked, none or only a portion of the field information is described throughout the area. For example, in the example illustrated in the lower portion of FIG. 15, only building/construction information of built structures and the like in the ground field that the player character PC has visited until the current time (information about built structures M6 to M9 illustrated in the lower portion of FIG. 15) is described.

In an upper portion of FIG. 15, an example of a ground map image in which field information of the area α illustrated in the lower portion of FIG. 15 is also locked, i.e., field information of all displayed ground areas is locked is displayed. As illustrated in the upper portion of FIG. 15, only a portion of the field information of the area α is described before field information is unlocked. Specifically, in the example illustrated in the upper portion of FIG. 15, before field information of the area α is unlocked, only building/construction information about built structures and the like in the ground field corresponding to the area α which the player character PC has visited until the current time (information about built structures M1 and M4 indicated in the upper portion of FIG. 15) is described.

As can be seen from comparison between the upper and lower portions of FIG. 15, the amount of field information described in the ground map image of the area α before field information thereof is unlocked is significantly smaller than after field information thereof is unlocked, and is described in a portion of the area α. It should be noted that the player character PC's current location C is indicated in a displayed ground map image no matter whether or not field information thereof is unlocked. In the example of FIG. 15, in both of the upper and lower portions of FIG. 15, a ground map image is displayed with the player character PC located in the ground field, and therefore, the current location C is described with a label (e.g., a closed mark) indicating that the player character PC is located in the ground field corresponding to a location in the ground map.

In a lower portion of FIG. 16, an example of an airspace map image including an area β where field information thereof is unlocked and the other area where field information thereof is locked. The area β is formed as one of a plurality of areas into which the airspace field is previously divided, as with a ground area, and detailed field information is described throughout the area β in the airspace map image. For example, detailed field information described in an airspace area when the field information thereof is unlocked includes information such as the names, shapes, and locations of airspace field objects floating in the airspace field corresponding to the airspace area, and the like. As an example, in the airspace map image of FIG. 16, airspace field objects M11 to M13 floating in the airspace field corresponding to the area β are described, and the shapes, types, locations, and the like thereof are indicated. In addition, in the displayed airspace map image, a current location C where the player character PC is currently located is indicated. In the other areas of the airspace map image, field information thereof is locked, and detailed field information thereof is not described, unlike the area β. In the present example, none or only a portion of field information is described throughout an airspace area where field information thereof is locked. For example, in the example of the lower portion of FIG. 16, no field information is described in the areas other than the area β.

It should be noted that as an example, a plurality of ground areas into which the ground field are divided and a plurality of airspace areas into which the airspace field are divided may be field regions that have the same shape and are arranged vertically in the virtual space. In that case, an airspace above the ground field corresponding to a given ground area is all the airspace field corresponding to the same airspace area, and these areas are represented as an area having the same shape in a ground map image and an airspace map image. As another example, ground areas and airspace areas may have different shapes.

In an upper portion of FIG. 16, an example of an airspace map image in which field information of the area β illustrated in the lower portion of FIG. 16 is also locked, i.e., field information of all displayed airspace areas is locked, is displayed. As illustrated in the upper portion of FIG. 16, no field information is described in the area β before field information thereof is unlocked.

As can be seen from comparison between the upper and lower portions of FIG. 16, the amount of field information described in the airspace map image of the area β before field information thereof is unlocked is significantly smaller than after field information thereof is unlocked. It should be noted that the player character PC's current location C is indicated in the displayed airspace map image no matter whether or not field information thereof is unlocked. In the example of FIG. 16, in both of the upper and lower portions of FIG. 16, an airspace map image is displayed with the player character PC located in the airspace field, and therefore, the current location C is described with a label (e.g., a closed mark) indicating that the player character PC is located in the airspace field corresponding to a location in the airspace map.

In a lower portion of FIG. 17, an example of an underground map image including an area γ where field information thereof is unlocked and the other areas where field information thereof is locked is displayed. The area γ is formed as a circular region depending on the player character PC's unlocking action. Detailed field information is described throughout the area γ of the underground map image. For example, detailed field information described in an underground area when field information thereof is unlocked includes terrain information such as the names, shapes, contour lines, and the like of seas, lakes, ponds, rivers, mountains, hills, forests, plains, and the like in the underground area, building/construction information such as the names, shapes, locations, and the like of roads, bridges, built structures, and the like provided in the underground field corresponding to the underground area, and the like. As an example, in the underground map image of FIG. 17, terrain and a built structure M20 built in the underground field corresponding to the area γ are described, and the shapes, types, locations, and the like thereof are indicated. In addition, in the displayed underground map image, a current location C where the player character PC is currently located is displayed. In the other areas of the underground map image, field information thereof is locked, and detailed field information thereof is not described, unlike the area γ. In the present example, in an underground area where field information thereof is locked, none or only a portion of the field information is described throughout the area. For example, in the example illustrated in the lower portion of FIG. 17, no field information is described in the areas other than the area γ.

In an upper portion of FIG. 17, an example of an underground map image in which field information of the area γ illustrated in the lower portion of FIG. 17 is also locked, i.e., field information of all displayed underground areas is locked, is displayed. As illustrated in the upper portion of FIG. 17, no field information is described for the area γ before field information thereof is unlocked.

As can be seen from comparison between the upper and lower portions of FIG. 17, the amount of field information described in the underground map image of the area γ before field information thereof is unlocked is significantly smaller than after field information thereof is unlocked. It should be noted that the player character PC's current location C is indicated in the displayed underground map image no matter whether or not field information thereof is unlocked. In the example of FIG. 17, in both of the upper and lower portions of FIG. 17, an underground map image is displayed with the player character PC located in the underground field, and therefore, the current location C is described with a label (e.g., a closed mark) indicating that the player character PC is located in the underground field corresponding to a location in the underground map.

Figure 18:
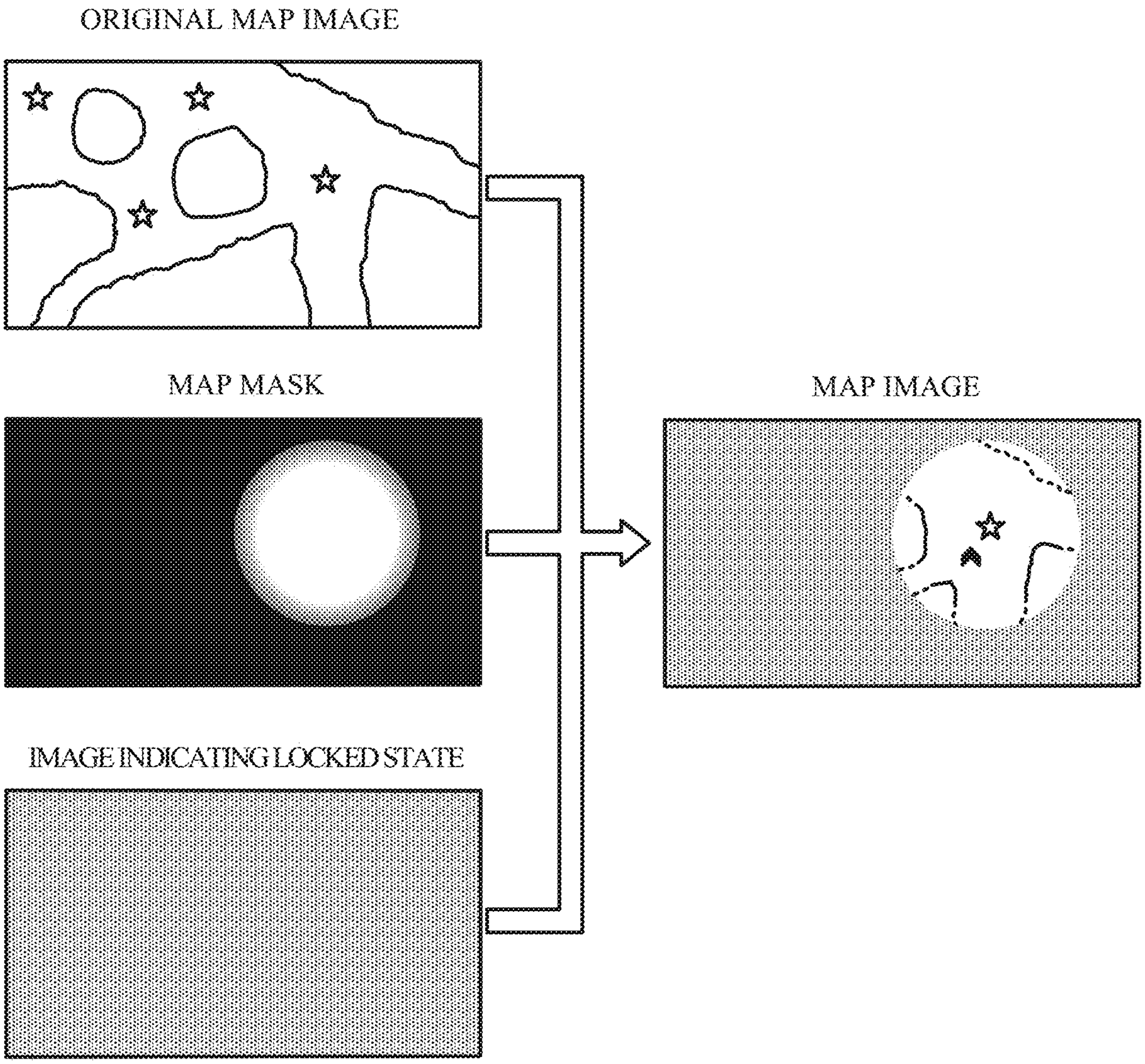
FIG. 18 is a diagram illustrating a non-limiting example of a method for generating a map image.

Next, an example of a method for generating a map image in the present example will be described with reference to FIG. 18. It should be noted that FIG. 18 is a diagram illustrating an example of a method for generating a map image in the present example. In the present example, the game system 1 generates a map image that is displayed, based on an original map image and a map mask.

The original map image refers to an image based on which a map image that is displayed is generated, i.e., a map image including all field information that can be displayed. The original map image can be said to be a map image in which field information is unlocked throughout a field.

The map mask refers to data indicating an area where field information thereof is to be unlocked. In other words, the map mask is two-dimensional data indicating a region of a field that is an area where field information thereof is to be unlocked. The game system 1 generates a map image in which field information thereof is shown for an unlocked area, using a map mask.

In the present example, the data of a map mask refers to data indicating a map mask value for each two-dimensional location. The map mask value refers to a degree at which an original map image is reflected, i.e., modified and displayed, in order to generate a map image. For example, the maximum and minimum values of the map mask value are 1 and 0, respectively. In this case, at a pixel having a map mask value of 1 (an open region in the map mask of FIG. 18), an original map image is directly reflected, i.e., displayed without modification, in a map image, and at a pixel having a map mask value of 0 (a closed region in the map mask of FIG. 18), no original map image is reflected or displayed in a map image. As an example, the map mask value is a binary value of 0 or 1. As another example, the map mask value is a multi-level value ranging from 0 to 1. In the case in which the map mask value is a multi-level value, if the map mask value of pixels at a boundary of an unlocked area (a gray region in the map mask of FIG. 18) is set to an intermediate value (i.e., a value of at least 0 and less than 1), a blurred map image can be displayed at and near the boundary of the unlocked area.

The game system 1 looks up a map mask, and combines an original map image with an image showing a locked state at a ratio corresponding to a map mask value for each pixel, to generate a map image. Specifically, the game system 1 generates a map image in which an original map image is directly reflected, i.e., displayed without modification, at a pixel having a map mask value of 1, no original map image is reflected or displayed at a pixel having a map mask value of 0, and an original map image is reflected, i.e., modified and displayed, at a ratio corresponding to a map mask value at a pixel having an intermediate map mask value. An image indicating a locked state may be rendered in a single color or in a predetermined pattern or the like. The combined map image may be further combined with a grid pattern or the like in order to allow coordinates to be easily recognized. As a result, in a map image, an unlocked area is displayed at a lower density in the vicinity of a boundary thereof (specifically, a location having an intermediate map mask value) (see FIG. 18). It should be noted that in FIG. 18 a portion of a map image that is displayed at a lower density is represented by a dashed line.

When the player character PC performs the action of unlocking field information, the game system 1 generates and updates two-dimensional mask data (i.e., a map mask) indicating an area that is to be unlocked by the action. In addition, the game system 1 applies the updated mask data to an original map image including field information to generate a map image in which field information of a portion thereof corresponding to the unlocked area is shown. As a result, a map image showing a portion corresponding to an unlocked area can be easily generated. It should be noted that in another example, a map image may be generated by any specific method, and is not limited to a method using mask data.

In the present example, while a game is being played in which the player character PC's action can be controlled according to the user's operation input (i.e., a game is being played in the field mode), the field mode can be switched to the map display mode with any timing desired by the user, so that a map image can be displayed. For example, when a game is being played, then if the user performs a predetermined command operation input (e.g., a map display switch operation input of pressing down the minus button 47 of the left controller 3), the game mode may be changed from the field mode to the map display mode, so that a map image of at least any of a ground map, airspace map, and underground map corresponding to an area where the player character PC is located is displayed. When the map image is displayed, the ground map image, airspace map image, and underground map image are displayed with predetermined field information included in an area where field information thereof is unlocked (e.g., detailed field information thereof is described) and not included in an area where field information thereof is locked (e.g., detailed field information thereof is not described).

When the map image is displayed, display map images can be switched according to the user's operation input for switching between a ground map, an airspace map, and an underground map (e.g., a map switching operation input of pressing down the up button 35 or the down button 34 of the left controller 3). For example, in the map images of FIGS. 15 to 17, a field designation image that indicates fields that can be chosen and a field that is being displayed is displayed in a left side region, and a map name displayed in an open region indicates the field that is being displayed. It should be noted that the field designation image may indicate fields (layers) using character information or an image such as an icon.

It should be noted that the destination of a long distance movement is not limited to the built structure designated by the user's command operation input, and may be any location that is designated in an unlocked area in a field of the virtual space. As a result, the player character PC can perform a long distance movement to a location designated by the user or surroundings thereof in an area in a field where field information thereof is unlocked, quickly no matter where the player character PC is located, resulting in easy field exploration. It should be noted that in another example, the destination may be any location that is designated by the user's command operation input, in a field of the virtual space, in an area where field information thereof is locked.

In addition, a map image displayed in the long distance movement scene in the present example may be one that is obtained by capturing a portion of a map image (field map image) that is generated based on field information that is unlocked by the player character PC causing a predetermined unlock event to occur at a predetermined location in the virtual space. Specifically, when a game is being played, transition to the map display mode is performed according to the user's predetermined command operation input, so that a map image (field map image) is once generated, and subsequently, an image obtained by capturing a portion of the map image and stored may be used in the long distance movement scene. As a result, in the case in which the processing load of generating a map image used in the long distance movement scene is great, such processing load can be reduced by capturing and displaying a portion of a field map image already generated. In particular, during the waiting period that the long distance movement scene is performed, loading may be being performed, and therefore, a significant effect can be expected by the reduction of the processing load of generating a map image.

Figure 19:
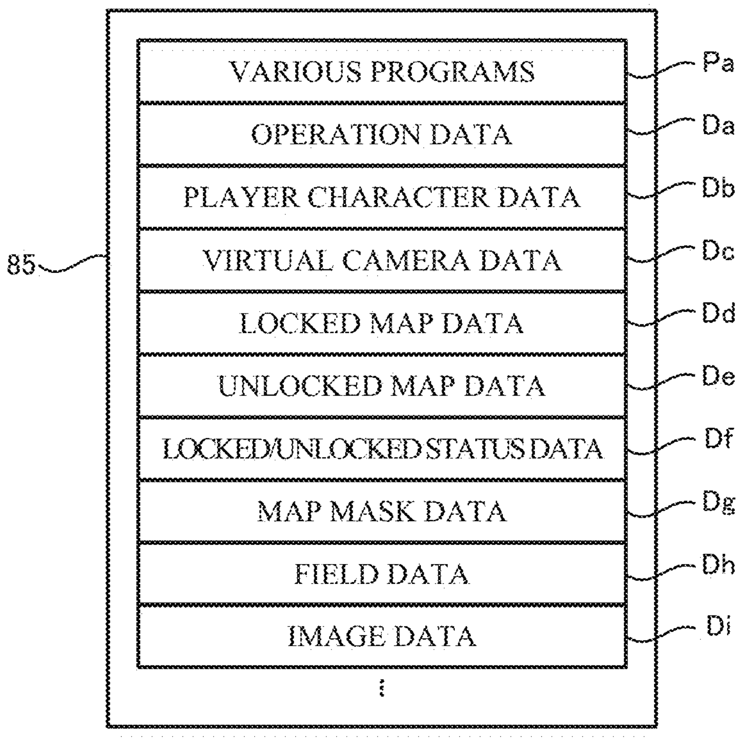
FIG. 19 is a diagram illustrating a non-limiting example of a data area set in a DRAM 85 of a main body apparatus 2.

Next, an example of a specific process that is executed in the game system 1 will be described with reference to FIG. 19. FIG. 19 is a diagram illustrating an example of a data area set in the DRAM 85 of the main body apparatus 2. It should be noted that in addition to the data of FIG. 19, the DRAM 85 also stores data used in other processes, which will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4 and the main body apparatus 2, and the like. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

In addition, the data storage area of the DRAM 85 stores various kinds of data that are used in processes that are executed in the game system 1 such as information processes. In the present example, the DRAM 85 stores operation data Da, player character data Db, virtual camera data Dc, locked map data Dd, unlocked map data De, locked/unlocked status data Df, map mask data Dg, field data Dh, image data Di, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The player character data Db indicates the location, direction, and pose, and an action and state in the virtual space, of the player character PC located in the virtual space, and the like.

The virtual camera data Dc indicates the location, direction, angle of view, and the like of a virtual camera disposed in the virtual space.

The locked map data Dd indicates a ground map image, airspace map image, and underground map image in which field information thereof is locked. The unlocked map data De indicates a ground map image, airspace map image, and underground map image in which field information thereof is unlocked.

The locked/unlocked status data Df indicates a locked/unlocked status of field information of each area in the ground field, airspace field, and underground field.

The map mask data Dg indicates an area where field information thereof is to be unlocked in each field.

The field data Dh indicates information (field information, map information, and the like) about a field in an area where the player character PC moves, which is read out by a loading process.

The image data Di is for displaying an image (e.g., an image of the player character PC, an image of another character, an image of a virtual object, an image of a field of the virtual space, a map image, and a background image) on a display screen (e.g., the display 12 of the main body apparatus 2).

Figure 20:
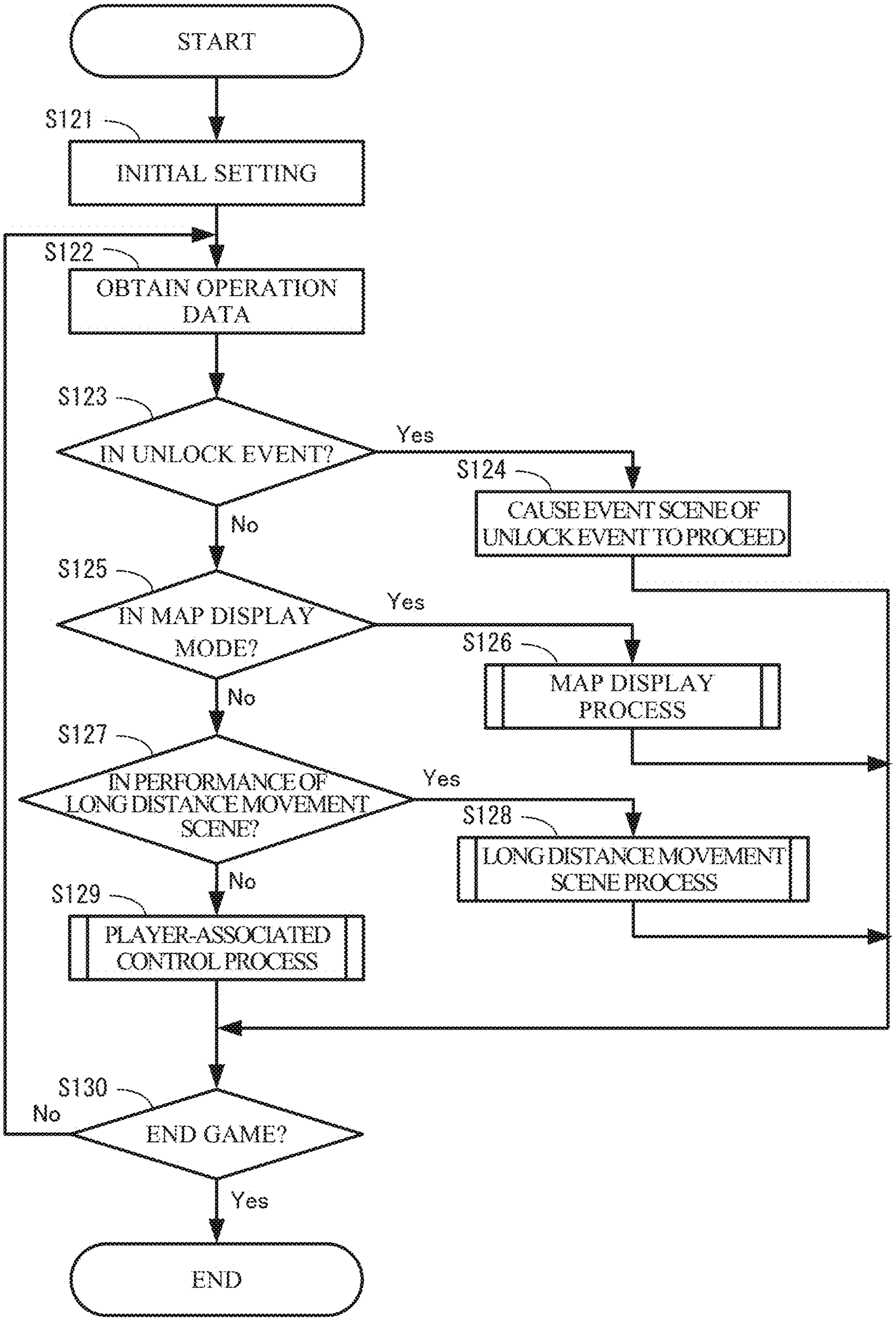
FIG. 20 is a flowchart illustrating a non-limiting example of a game process that is executed in a game system 1.
Figure 21:
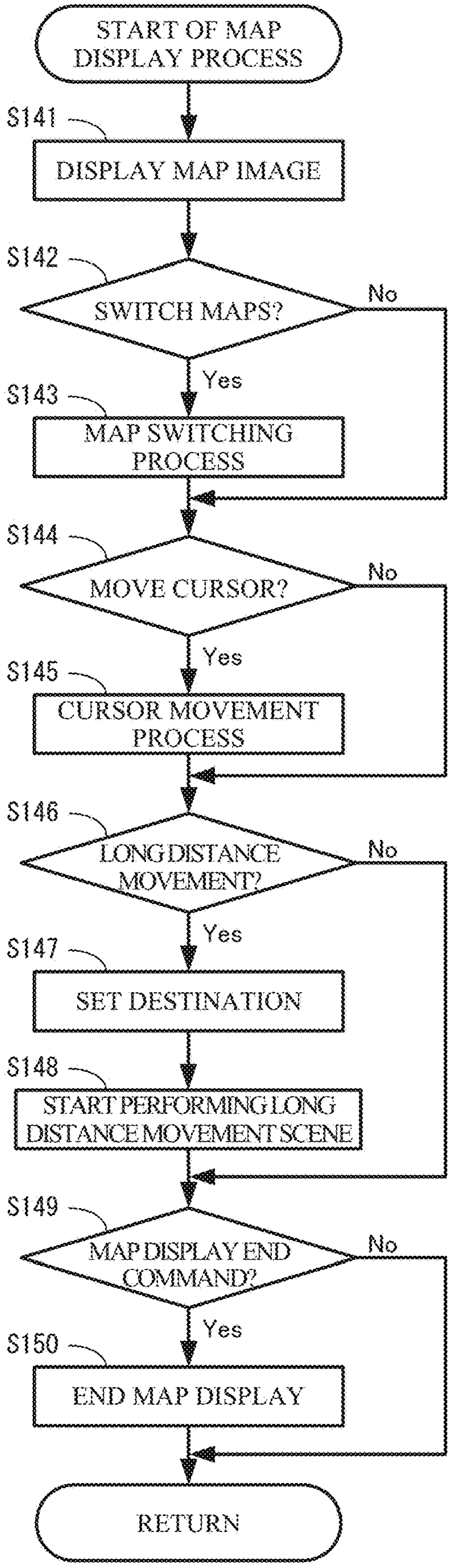
FIG. 21 is a subroutine illustrating a non-limiting example of a map display process of step S126 in FIG. 20.
Figure 22:
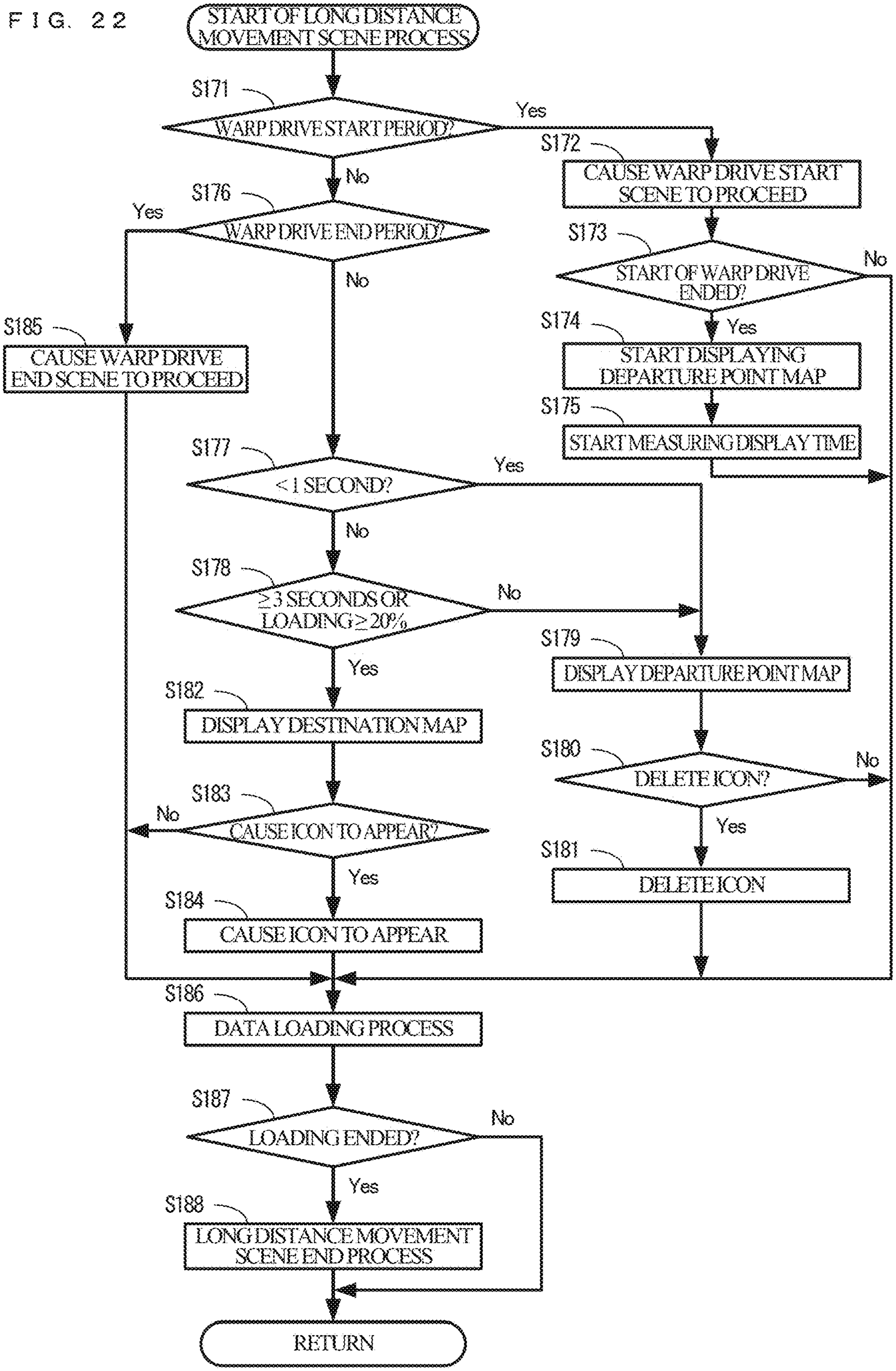
FIG. 22 is a subroutine illustrating a non-limiting example of a long distance movement scene process of step S128 in FIG. 20.
Figure 23:
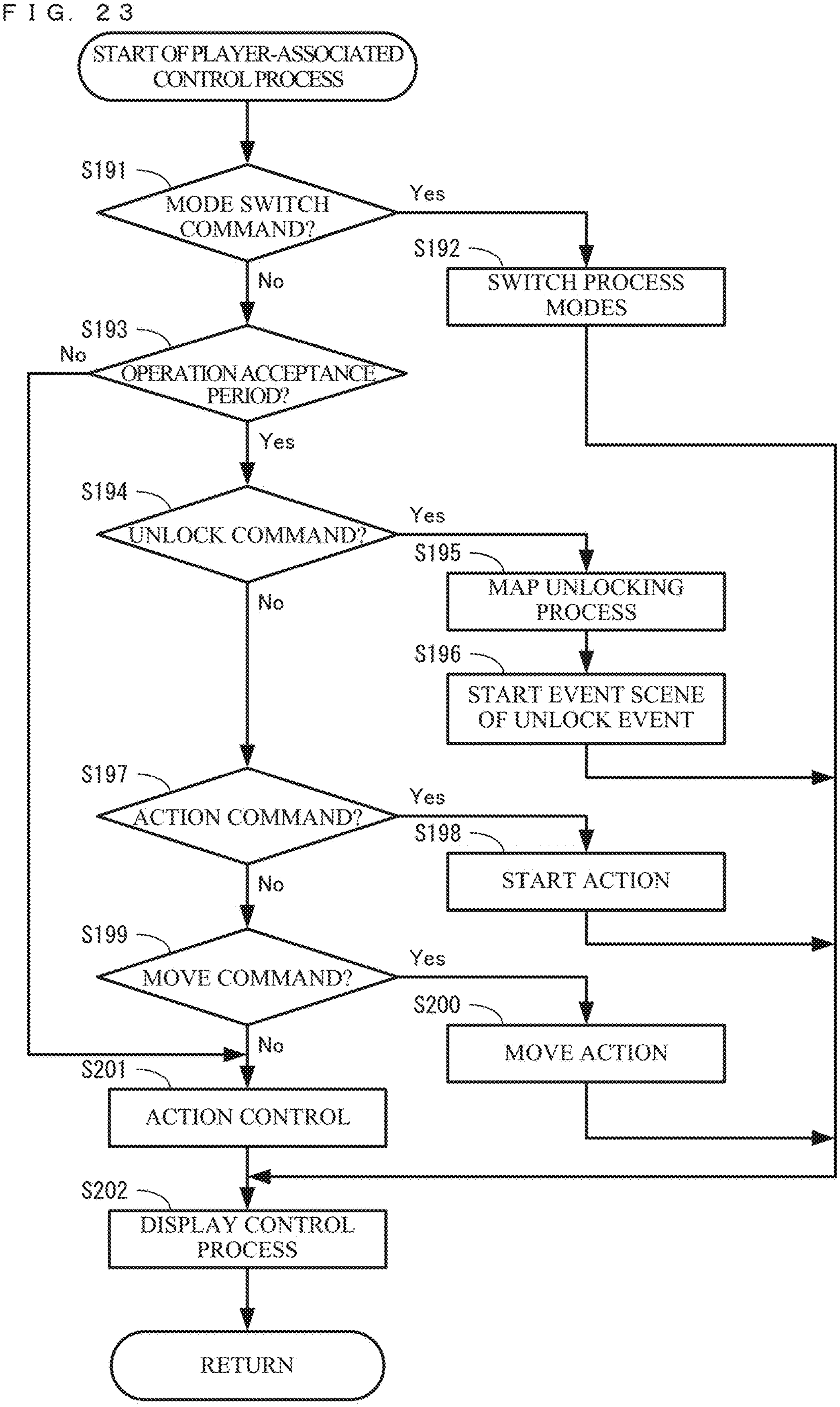
FIG. 23 is a subroutine illustrating a non-limiting example of a player-associated control process of step S129 in FIG. 20.

Next, a detailed example of a game process that is an example of an information process in the present example will be described with reference to FIGS. 20 to 23. FIG. 20 is a flowchart illustrating an example of a game process that is executed in the game system 1. FIG. 21 is a subroutine illustrating an example of a map display process of step S126 in FIG. 20. FIG. 22 is a subroutine illustrating an example of a long distance movement scene process of step S128 in FIG. 20. FIG. 23 is a subroutine illustrating an example of a player-associated control process of step S129 in FIG. 20. In the present example, a series of steps illustrated in FIGS. 20 to 23 are executed by the processor 81 executing a predetermined application program (game program) included the programs Pa. The game process of FIGS. 20 to 23 is started with any appropriate timing.

It should be noted that the steps in the flowcharts of FIGS. 20 to 23, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 20 to 23 may be executed by a plurality of information processing apparatuses including the main body apparatus 2 cooperating with each other.

In FIG. 20, the processor 81 executes initial setting for the game process (step S121), and proceeds to the next step. For example, in the initial setting, the processor 81 initializes parameters for executing steps described below, and updates each data. As an example, the processor 81 disposes virtual objects, other characters, and the like in the ground field, airspace field, and underground field of the virtual space to generate an initial state of the virtual space. Thereafter, the processor 81 disposes the player character PC and the virtual camera in a predetermined pose and orientation at default locations in the virtual space in the initial state, and updates the player character data Db and the virtual camera data Dc. In addition, the processor 81 updates the locked/unlocked status data Df according to the locked/unlocked status of field information of each area in the ground field, airspace field, and underground field of the virtual space (e.g., all areas are set locked during the start of a game, and when a game is resumed from a halfway point, are set to a locked/unlocked status before interruption of the game, based on saved data or the like).

Next, the processor 81 obtains operation data from the left controller 3, the right controller 4, and/or the main body apparatus 2, updates the operation data Da (step S122), and proceeds to the next step.

Next, the processor 81 determines whether or not an event scene of an unlock event is being performed (step S123). For example, when an unlock event occurs, the processor 81 starts playing back an animation of an event scene showing the unlock event (see step S196 described below). If the event scene animation is being played back, the result of the determination by the processor 81 in step S123 is positive. If the event scene of an unlock event is being performed, the processor 81 proceeds to step S124. Otherwise, i.e., if the event scene of an unlock event is not being performed, the processor 81 proceeds to step S125.

In step S124, the processor 81 continues progression of the event scene that is being performed, and proceeds to step S130. Specifically, the processor 81 displays an image of the event scene animation on the display 12. It should be noted that when step S124 is executed once, a frame of image is displayed. When the event scene is being performed, step S124 is repeatedly executed, whereby the animation is played back. A rendering process during an event may be similar to that which is executed in the field mode in which a field image is displayed. Alternatively, different rendering processes may be executed for expressing different scenes. Any specific different rendering processes may be employed and will not be described in detail.

In step S125, the processor 81 determines whether or not the processor 81 is in the map display mode in which a map image (field map image) is displayed. In the present example, when the user performs a map display operation input in the field mode in which a field image is displayed, the map display mode is started (see step S192 described below). If the processor 81 is in the map display mode, the processor 81 proceeds to step S126. Otherwise, i.e., if the processor 81 is not in the map display mode, the processor 81 proceeds to step S127.

In step S126, the processor 81 executes a map display process of displaying a map image on the display 12, and proceeds to step S130. The map display process executed in step S125 will be described below with reference to FIG. 21.

In FIG. 21, the processor 81 generates and displays a map image on the display 12 (step S141), and proceeds to the next step. In step S141 (i.e., in the map display mode), a map image is displayed in the entire region of the display 12 without a field image being displayed (see FIGS. 15 to 17). For example, in a default state after transitioning to the map display mode, the processor 81 generates a map image of a field where the player character PC is located, in which a cursor image indicating a location designated by the user is displayed at a default location, overlaying the map image, according to the above method, and displays the map image on the display 12. In addition, when fields of a map image that is displayed in a process described below are switched, the processor 81 generates a map image of the chosen field according to the above method, and displays the generated map image on the display 12. In addition, when the location of the cursor image is moved in a process described below, the processor 81 displays, on the display 12, a map image that the cursor image overlays at the cursor location after the movement.

Next, the processor 81 determines whether or not an operation of switching fields of a map image that is displayed has been performed (step S142). For example, if the operation data Da indicates that an operation of switching fields of a map image that is displayed has been performed (e.g., a map switching operation input of pressing down the up button 35 or the down button 34 of the left controller 3), the result of the determination by the processor 81 in step S142 is positive. If the operation of switching maps has been performed, the processor 81 proceeds to step S143. Otherwise, i.e., if the operation of switching maps has not been performed, the processor 81 proceeds to step S146.

In step S143, the processor 81 executes a process of switching fields of a map image that is displayed, and proceeds to step S146. For example, the processor 81 switches map images to be displayed, according to an operation input for switching maps, and sets the chosen map image.

In step S144, the processor 81 determines whether or not the user has performed an operation for moving the location of a cursor image indicating a location designated by the user. For example, if the operation data Da indicates an operation input for moving the cursor image (e.g., a cursor movement operation input of tilting the left stick 32 or the right stick 52), the result of the determination by the processor 81 in step S144 is positive. If the user has performed an operation for moving the cursor image, the processor 81 proceeds to step S145. Otherwise, i.e., if the user has not performed an operation for moving the cursor image, the processor 81 proceeds to step S146.

In step S145, the processor 81 executes a process of moving the displayed cursor image, and proceeds to step S146. For example, the processor 81 moves and sets a cursor location in a map image according to the cursor movement operation input. It should be noted that if the cursor movement operation input indicates a command to move the cursor location out of the display range of a map image, the processor 81 may scroll the map image according to the command to move the display range of the map image in step S141. As an example, the processor 81 may scroll a map image in a direction opposite to the direction indicated by the cursor movement operation input (e.g., the direction in which the left stick 32 or the right stick 52 is tilted), at the movement speed indicated by the cursor movement operation input (e.g., the angle at which the left stick 32 or the right stick 52 is tilted), and set the cursor location at a location overlaying an end of the display range of the map image corresponding to the direction.

In step S146, the processor 81 determines whether or not to cause the player character PC to perform a long distance movement. For example, if the user's command operation input indicated by the operation data Da is an operation of designating a location in a map image being displayed as the destination of a long distance movement, the result of the determination of the processor 81 in step S146 is positive. If the processor 81 determines to cause the player character PC to perform a long distance movement, the processor 81 proceeds to step S147. Otherwise, i.e., if the processor 81 determines not to cause the player character PC to perform a long distance movement, the processor 81 proceeds to step S149.

In step S147, the processor 81 sets the destination of a long distance movement, and proceeds to the next step. For example, as described above, the processor 81 designates a location in a map image that is overlaid by the cursor image set by the user's cursor movement operation input (e.g., a built structure or the like in an area where field information thereof is unlocked, or a built structure or the like that the player character PC has once visited) as the destination of a long distance movement.

Next, the processor 81 starts a long distance movement scene in which the player character PC performs a long distance movement, and switches the process mode to the field mode (step S148), and proceeds to step S149. For example, the processor 81 starts a long distance movement scene in which the player character PC is caused to perform a long distance movement from the location of the player character PC in the virtual space, as a departure point, to the destination set in step S147. In addition, in step S148, the processor 81 starts a loading process of reading out data of the field of the destination set in step S147, and starts the above waiting period.

In step S149, the processor 81 determines whether or not an operation for ending map display has been performed. For example, if the operation data Da indicates the user's operation input for ending map display, the result of the determination by the processor 81 in step S149 is positive. If an operation for ending map display has been performed, the processor 81 proceeds to step S150. Otherwise, i.e., if an operation for ending map display has not been performed, the processor 81 ends the subroutine.

In step S150, the processor 81 ends map display, switches the process mode to the field mode, and ends the subroutine. In this case, the result of the determination in step S125, which is next executed, is negative.

Referring back to FIG. 20, if in step S125 it is determined that the processor 81 is not in the map display mode, the processor 81 determines whether or not the long distance movement scene is being performed (step S127). For example, the processor 81 starts the long distance movement scene when step S148 is executed. If the long distance movement scene is being performed, the result of the determination by the processor 81 in step S127 is positive. If the long distance movement scene is being performed, the processor 81 proceeds to step S128. Otherwise, i.e., if the long distance movement scene is not being performed, the processor 81 proceeds to step S129.

In step S128, the processor 81 executes a long distance movement scene process, and proceeds to step S130. The long distance movement scene process in step S128 will be described below with reference to FIG. 22.

In FIG. 22, the processor 81 determines whether or not the current time is during a warp drive start period that the player character PC starts warp drive from the location of a departure point (step S171). If the current time is during the warp drive start period, the processor 81 proceeds to step S172. Otherwise, i.e., if the current time is not during the warp drive start period, the processor 81 proceeds to step S176.

In step S172, the processor 81 causes a warp drive start scene that is being displayed to proceed, updates the player character data Db, and proceeds to the next step. Specifically, the processor 81 displays, on the display 12, an image of an animation of a warp drive start scene in which the player character PC starts a long distance movement that is warp drive starting from the location of the departure point to the location of the set destination (see FIG. 9). It should be noted that when step S172 is executed once, a frame of image is displayed. When the warp drive start scene is being performed, step S172 is repeatedly executed, so that the animation is played back. As to a rendering process during the warp drive start period, a process similar to that which is executed in the field mode in which a field image is displayed may be executed. When a different scene is expressed, a different rendering process may be executed. Such a different rendering process may be any rendering process and will not be described in detail.

Next, the processor 81 determines whether or not the start of warp drive has ended (step S173). For example, if the animation of the warp drive start scene has ended, the result of the determination by the processor 81 in step S173 is positive. If the start of warp drive has ended, the processor 81 proceeds to step S174. Otherwise, i.e., if the start of warp drive has not ended, the processor 81 proceeds to step S186.

In step S174, the processor 81 starts displaying a map image showing field information of the departure point and its surroundings (see FIG. 10), and proceeds to the next step. It should be noted that the map image of the departure point and its surroundings displayed in step S174 may be obtained by capturing a portion of a map image displayed in the map display mode.

Next, the processor 81 starts measuring a display time (step S175), and proceeds to step S186.

If in step S171 it is determined that the current time is not during the warp drive start period, the processor 81 determines whether or not the current time is during a warp drive end period that the player character PC ends warp drive at a destination (step S176). If the current time is not during the warp drive end period, the processor 81 proceeds to step S177. Otherwise, i.e., if the current time is during the warp drive end period, the processor 81 proceeds to step S185.

In step S177, the processor 81 determines whether a display time that has started to be measured in step S175 is less than 1 second. If the display time is less than 1 second, the processor 81 proceeds to step S179. Otherwise, i.e., if the display time is at least 1 second, the processor 81 proceeds to step S178.

In step S178, the processor 81 determines whether or not the display time that has started to be measured in step S175 is at least 3 seconds or the progression of loading that has started in step S148 is at least 20%. If the display time is less than 3 seconds and the progression of loading is less than 20%, the processor 81 proceeds to step S179. Otherwise, i.e., if the display time is at least 3 seconds or the progression of loading is at least 20%, the processor 81 proceeds to step S182.

In step S179, the processor 81 continues to display the map image showing field information of the departure point and its surroundings, and proceeds to the next step. In step S179, if the icon image indicating the current location C of the player character PC has been deleted from the map image being displayed, the processor 81 may slide the map image in a direction opposite to the movement direction in the map image of the player character PC from the departure point to the destination in the long distance movement (e.g., the direction A1 in the upper portion of FIG. 11), at a predetermined movement speed, and display the resultant map image. In addition, in another example, in the case in which a process (e.g., a process of updating the details of tips that are displayed, overlaying a game image displayed during the long distance movement scene, based on the user's operation input) is allowed according to the user's operation input during the waiting period, an image based on the user's command operation input indicated by the operation data Da may be displayed, overlaying a map image, in step S179.

Next, the processor 81 determines whether or not it is time to delete the icon image indicating the current location C of the player character PC from the map image being displayed (step S180). If it is time to delete the icon image indicating the current location C, the processor 81 proceeds to step S181. Otherwise, i.e., if it is not time to delete the icon image indicating the current location C or the icon image has already been deleted from the map image being displayed, the processor 81 proceeds to step S186. It should be noted that the processor 81 may determine whether or not the current time is time to delete the icon image indicating the current location C, based on the display time or the progression of loading.

In step S181, the processor 81 deletes the icon image indicating the current location C of the player character PC from the map image that is being displayed, indicating field information of the departure point and its surroundings (see the lower portion of FIG. 10), and proceeds to step S186.

If it is determined that the display time is at least 3 seconds or the progression of loading is at least 20%, the processor 81 displays a map image showing field information of the destination and its surroundings (step S182), and proceeds to the next step. It should be noted that the map image showing field information of the destination and its surroundings, that is displayed in step S182 (see the lower portion of FIG. 11, and FIG. 12), may be obtained by capturing a portion of a map image displayed in the map display mode. In addition, in order that a map image around the destination is finally displayed, the processor 81 may slide the map image being displayed in a direction opposite to the player character PC's movement direction (the direction A2 in the lower diagram of FIG. 11) in the map image toward the destination in the long distance movement, at a predetermined movement speed, and display the resultant map image. In addition, in another example, in the case in which a process (e.g., a process of updating the details of tips that are displayed, overlaying a game image displayed during a long distance movement scene, based on the user's operation input) that is executed according to the user's operation input is allowed during the waiting period, an image based on the user's command operation input indicated by the operation data Da may be displayed, overlaying a map image, in step S182.

Next, the processor 81 determines whether or not it is time to cause an icon image indicating the current location C of the player character PC to appear in the map image being displayed (step S183). If it is time to cause an icon image indicating the current location C to appear, the processor 81 proceeds to step S184. Otherwise, i.e., if it is not time to cause an icon image indicating the current location C to appear, or the icon image has already been displayed in the map image being displayed, the processor 81 proceeds to step S186. It should be noted that the processor 81 may determine whether or not it is time to cause an icon image indicating the current location C of the player character PC to appear, based on the display time or the progression of loading.

In step S184, the processor 81 causes an icon image indicating the current location C of the player character PC to appear and be displayed at the location of the destination in the map image that is being displayed, showing field information of the destination and its surroundings (see the lower portion of FIG. 12), and proceeds to step S186.

If in step S176 it is determined that the current time is during the warp drive end period, the processor 81 causes a warp drive end scene to proceed, updates the player character data Db (step S185), and proceeds to step S186. Specifically, the processor 81 displays, on the display 12, an image of an animation of a warp drive end scene in which the player character PC's warp drive to the location of the destination ends, and thus the long distance movement ends (see FIG. 13). It should be noted that when step S185 is executed once, a frame of image is displayed. During execution of the warp drive end scene, step S186 is repeatedly executed so that the animation is played back. During the warp drive end period, a rendering process similar to that which is executed in the field mode in which a field image is being displayed may be executed. When a different scene is expressed, a different rendering process may be executed. Such a different rendering process may be any rendering process and will not be described in detail.

In step S186, the processor 81 executes a data loading process, and proceeds to the next step. For example, the processor 81 executes a process of causing loading that is the process of reading out data of the field of the destination, which has been started in step S148, to proceed for a frame, and adds the data to the field data Dh.

Next, the processor 81 determines whether or not the loading has ended (step S187). If the loading has ended, the processor 81 proceeds to step S188. Otherwise, i.e., if the loading has not ended, the processor 81 ends the subroutine.

In step S188, the processor 81 ends the long distance movement scene, executes a process of returning to the normal process in the field mode, and ends the subroutine.

Referring back to FIG. 20, if in step S127 it is determined that the processor 81 is not performing a long distance movement scene, the processor 81 executes a player-associated process (step S129), and proceeds to step S130. In the player-associated process, various processes (e.g., a control process associated with a player character) are executed based on the user's operation input. The player-associated process of step S129 will be described below with reference to FIG. 23.

In FIG. 23, the processor 81 determines whether or not the user has given a command to switch process modes, with reference to the operation data Da (step S191). For example, if the user has given a command to display a map image, the result of the determination by the processor 81 in step S191 is positive. If a command to switch process modes has been given, the processor 81 proceeds to step S192. Otherwise, i.e., if a command to switch process modes has not been given, the processor 81 proceeds to step S193.

In step S192, the processor 81 switches process modes according to the user's command, and proceeds to step S202. Specifically, if the user's operation input indicated by the operation data Da indicates a command to display a map image, the process mode is switched to the map display mode.

If in step S191 it is determined that a command to switch process modes has not been given, the processor 81 determines whether or not the processor 81 is during an operation acceptance period that the user's operation input for the player character PC is accepted (step S193). Here, in the present example, it is assumed that the operation acceptance period excludes an action period during which the player character PC performs a predetermined action (e.g., an action controlled in step S198 described below) according to the user's operation input for the player character PC. If the processor 81 is during the operation acceptance period, the processor 81 proceeds to step S194. Otherwise, i.e., if the processor 81 is not during the operation acceptance period, the processor 81 proceeds to step S201.

In step S194, the processor 81 determines whether or not the user's operation input for unlocking field information of a map image has been performed. For example, if an operation input for causing the player character PC to perform the action of investigating a specific location in the virtual space with the player character PC located in the vicinity of the specific location (e.g., the user's operation input of choosing an "investigate" command) has been performed, the result of the determination by the processor 81 in step S194 is positive. If the user's operation input for unlocking field information has been performed, the processor 81 proceeds to step S195. Otherwise, i.e., if the user's operation input for unlocking field information has not been performed, the processor 81 proceeds to step S197.

In step S195, the processor 81 executes a map unlocking process of unlocking field information of an area based on the specific location where the operation input has been performed, and proceeds to the next step. For example, the processor 81 sets the locked/unlocked status of field information of an area based on the specific location to the unlocked status, and updates the locked/unlocked status data Df. Thereafter, the processor 81 generates a map mask for the unlocked area based on the locked/unlocked status data Df according to the above method, and updates the map mask data Dg. As an example, during the start of a game process, data of a map mask is stored in the map mask data Dg of the memory, and the processor 81 updates the map mask data Dg such that the map mask data Dg indicates the set unlocked area.

Next, the processor 81 starts an event scene of an unlock event in which field information is unlocked (step S196), and proceeds to step S202. For example, the processor 81 starts playing back an animation of an event scene displaying an unlock event in which field information of an area based on the specific location is unlocked. After step S196, the result of the determination in step S123 is positive and the event scene of the unlock event continues to be performed until the animation has been completely played back.

If in step S194 it is determined that the user's operation input for unlocking field information has not been performed, the processor 81 determines, based on the operation data Da, whether or not the user's operation input for giving an action command to the player character PC to perform an action has been performed (step S197). Here, the action command is for causing the player character PC to perform an attack action, a jump action, or the like, for example. If an action command to the player character PC has been performed, the processor 81 proceeds to step S198. Otherwise, i.e., if an action command to the player character PC has not been performed, the processor 81 proceeds to step S199.

In step S198, the processor 81 causes the player character PC to start an action corresponding to the user's action command, updates the player character data Db, and proceeds to step S202. After the player character PC starts an action in step S198, the player character PC is controlled by a process of step S201 described below such that the player character PC performs the action for a predetermined period of time.

If in step S197 it is determined that an action command has not been given to the player character PC, the processor 81 determines whether or not the user's operation input for giving a move command to the player character PC has been performed, based on the operation data Da (step S199). Here, the move command is for causing the player character PC to move in a field. If a move command has been given to the player character PC, the processor 81 proceeds to step S200. Otherwise, i.e., if a move command has not been given to the player character PC, the processor 81 proceeds to step S201.

In step S200, the processor 81 causes the player character PC to move in a field according to the user's move command, updates the player character data Db, and proceeds to step S202.

In step S201, the processor 81 controls the player character PC such that the player character PC continues to perform an action started in step S198, or various actions such as an action that is performed when there is no input, updates the player character data Db, and proceeds to step S202. It should be noted that when step S201 is executed once, the processor 81 controls the player character PC such that the player character PC performs one frame's worth of action. When step S201 is repeatedly executed over a plurality of frames, the player character PC performs a series of actions according to the user's action command. It should be noted that if a command to the player character PC to perform an action has not been given by the user (e.g., the action started in step S198 has ended), the processor 81 may not cause the player character PC to perform an action, or may cause the player character PC to perform an action such that the player character PC's behavior appears to be natural (e.g., an action of looking around or rocking the body, or an action based on virtual physical calculation (e.g., Newton's first law or Newton's law of universal gravitation) or the like in the virtual space) in step S201.

In step S202, the processor 81 executes a display control process, and ends the subroutine. For example, the processor 81 disposes the player character PC in the virtual space based on the player character data Db. In addition, the processor 81 disposes other characters and objects in the virtual space. In addition, the processor 81 sets the location and/or orientation of a virtual camera for generating a display image, based on the virtual camera data Dc, and disposes the virtual camera in the virtual space. Thereafter, the processor 81 performs control to generate an image (field image) of the virtual space as viewed from the virtual camera, and display the virtual space image on the display 12. It should be noted that the processor 81 may execute a process of controlling a movement of the virtual camera in the virtual space based on the location and pose of the player character PC, and update the virtual camera data Dc. In addition, the processor 81 may move the virtual camera in the virtual space based on the operation data Da, and update the virtual camera data Dc. In addition, the processor 81 may generate a map image in addition to the virtual space image, and display the map image such that the map image overlays a portion of the virtual space image.

Referring back to FIG. 20, in step S130, the processor 81 determines whether or not to end the game process. In step S130, the game process is ended, for example, if a condition for ending the game process is satisfied, the user has performed an operation of ending the game process, or the like. If the processor 81 determines not to end the game process, the processor 81 returns to step S122, and repeats the process. Otherwise, i.e., if the processor 81 determines to end the game process, the processor 81 ends the flowchart. Following this, steps S122 to S130 are repeatedly executed until the processor 81 determines to end the game process in step S130.

Thus, in the present example, a more variety of scenes that are displayed during a waiting period that occurs when the player character PC performs a long distance movement can be provided. In addition, in the scenes, a map image showing field information of a departure point of a long distance movement and its surroundings and a map image showing field information of a destination of the long distance movement and its surroundings are displayed, and therefore, the user can be notified of the statuses of the fields of the departure point and destination of the long distance movement. Therefore, the use can also experience feeling like the user moves in a field even during the waiting period.

The game system 1 may be any suitable apparatus, including handheld game apparatuses, personal digital assistants (PDAs), mobile telephones, personal computers, cameras, tablet computers, and the like.

In the foregoing, the information process (game process) is performed in the game system 1 by way of example. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is useful as a game program, game system, game apparatus, game processing method, and the like that are capable of providing a more variety of scenes and the like during a waiting period that at least a portion of a game process is interrupted.

What is claimed is:

1. A non-transitory computer-readable storage medium having stored therein instructions that, when executed, cause one or more processors of an information processing apparatus to execute game processing comprising:

executing a game process including controlling a player character in a field of a virtual space based on a user's operation input, and displaying a game image including the field based on a virtual camera; and when a command is given to perform a long distance movement that causes a location of the player character to move from a departure point where the player character is currently located to a destination that is away from the departure point and is designated based on the user's operation input, interrupting at least a portion of the game process, starting a waiting period that continues until the interrupted game process is resumed, until the end of the waiting period, first displaying a first map image showing field information of the departure point and surroundings thereof, and after the first displaying, second displaying a second map image showing field information of the destination and surroundings thereof, and after the end of the waiting period, disposing the player character at the destination in the virtual space, and resuming the interrupted game process.

2. The non-transitory computer-readable storage medium according to claim 1, wherein the game processing further comprises:

third displaying a field map image showing field information in the virtual space based on the user's operation input, and the command to perform the long distance movement is to designate a location in the field map image as the destination based on the user's operation input during the third displaying.

3. The non-transitory computer-readable storage medium according to claim 2, wherein the first map image is a range of the field map image around the departure point, and the second map image is a range of the field map image around the destination.

4. The non-transitory computer-readable storage medium according to claim 3, wherein the field map image includes a portion in which the field information is disclosed and a portion in which the field information is undisclosed, and the game processing further comprises:

when an event occurs at a location in the virtual space based on the game process, updating the field map image such that field information of a range corresponding to the location where the event occurs is disclosed.

5. The non-transitory computer-readable storage medium according to claim 4, wherein in the first displaying, the first map image is generated by capturing a range around the departure point of the field map image including the portion in which the field information is disclosed and the portion in which the field information is undisclosed, and is displayed, and in the second displaying, the second map image is generated by capturing a range around the destination of the field map image including the portion in which the field information is disclosed and the portion in which the field information is undisclosed, and is displayed.

6. The non-transitory computer-readable storage medium according to claim 1, wherein during a period of time in the first displaying, the first map image is slid in a direction opposite to a direction from the departure point toward the destination in the map image, and is displayed, and during a period of time in the second displaying, the second map image is slid in a direction opposite to a direction from the departure point toward the destination in the map image, and is displayed.

7. The non-transitory computer-readable storage medium according to claim 1, wherein in the first displaying, an icon image showing a location of the player character is displayed at the departure point in the first map image, and subsequently, is deleted with first timing, and in the second displaying, the second map image without the icon image is displayed, and subsequently, the icon image is displayed at the destination in the second map image with second timing.

8. The non-transitory computer-readable storage medium according to claim 1, wherein the game processing further comprises:

during the waiting period, storing data including at least data of a field of the destination into a memory; and ending the waiting period after completion of the storing.

9. The non-transitory computer-readable storage medium according to claim 8, wherein the first displaying is continued for at least a first period of time, and after the end of the first period of time, the second displaying is started when a second period of time has elapsed or progression of the storing has reached a level.

10. A game system comprising:

one or more processors; and one or more memories storing instructions that, when executed, cause the game system to perform operations including:

executing a game process including controlling a player character in a field of a virtual space based on a user's operation input, and displaying a game image including the field based on a virtual camera; and when a command is given to perform a long distance movement that causes a location of the player character to move from a departure point where the player character is currently located to a destination that is away from the departure point and is designated based on the user's operation input, interrupting at least a portion of the game process, starting a waiting period that continues until the interrupted game process is resumed, until the end of the waiting period, first displaying a first map image showing field information of the departure point and surroundings thereof, and after the first displaying, second displaying a second map image showing field information of the destination and surroundings thereof, and after the end of the waiting period, disposing the player character at the destination in the virtual space, and resuming the interrupted game process.

11. The game system according to claim 10, wherein further, third displaying is performed to display a field map image showing field information in the virtual space based on the user's operation input, and the command to perform the long distance movement is to designate a location in the field map image as the destination based on the user's operation input during the third displaying.

12. The game system according to claim 11, wherein the first map image is a range of the field map image around the departure point, and the second map image is a range of the field map image around the destination.

13. The game system according to claim 12, wherein the field map image includes a portion in which the field information is disclosed and a portion in which the field information is undisclosed, and further, when an event occurs at a location in the virtual space based on the game process, the field map image is updated such that field information of a range corresponding to the location where the event occurs is disclosed.

14. The game system according to claim 13, wherein in the first displaying, the first map image is generated by capturing a range around the departure point of the field map image including the portion in which the field information is disclosed and the portion in which the field information is undisclosed, and is displayed, and in the second displaying, the second map image is generated by capturing a range around the destination of the field map image including the portion in which the field information is disclosed and the portion in which the field information is undisclosed, and is displayed.

15. The game system according to claim 10, wherein during a period of time in the first displaying, the first map image is slid in a direction opposite to a direction from the departure point toward the destination in the map image, and is displayed, and during a period of time in the second displaying, the second map image is slid in a direction opposite to a direction from the departure point toward the destination in the map image, and is displayed.

16. The game system according to claim 10, wherein in the first displaying, an icon image showing a location of the player character is displayed at the departure point in the first map image, and subsequently, is deleted with first timing, and in the second displaying, the second map image without the icon image is displayed, and subsequently, the icon image is displayed at the destination in the second map image with second timing.

17. The game system according to claim 10, wherein further, during the waiting period, data including at least data of a field of the destination is stored into a memory, and the waiting period ends after completion of the storing.

18. The game system according to claim 17, wherein the first displaying is continued for at least a first period of time, and after the end of the first period of time, the second displaying is started when a second period of time has elapsed or progression of the storing has reached a level.

19. A game apparatus comprising:

one or more processors; and one or more memories storing instructions that, when executed, cause the game apparatus to perform operations including:

executing a game process including controlling a player character in a field of a virtual space based on a user's operation input, and displaying a game image including the field based on a virtual camera; and when a command is given to perform a long distance movement that causes a location of the player character to move from a departure point where the player character is currently located to a destination that is away from the departure point and is designated based on the user's operation input, interrupting at least a portion of the game process, starting a waiting period that continues until the interrupted game process is resumed, until the end of the waiting period, first displaying a first map image showing field information of the departure point and surroundings thereof, and after the first displaying, second displaying a second map image showing field information of the destination and surroundings thereof, and after the end of the waiting period, disposing the player character at the destination in the virtual space, and resuming the interrupted game process.

20. A game processing method for causing one or more processors of an information processing apparatus to at least:

execute a game process including controlling a player character in a field of a virtual space based on a user's operation input, and displaying a game image including the field based on a virtual camera; and when a command is given to perform a long distance movement that causes a location of the player character to move from a departure point where the player character is currently located to a destination that is away from the departure point and is designated based on the user's operation input, interrupt at least a portion of the game process, start a waiting period that continues until the interrupted game process is resumed, until the end of the waiting period, first display a first map image showing field information of the departure point and surroundings thereof, and after the first displaying, second display a second map image showing field information of the destination and surroundings thereof, and after the end of the waiting period, dispose the player character at the destination in the virtual space, and resume the interrupted game process.

21. The game processing method according to claim 20, wherein further, third displaying is performed to display a field map image showing field information in the virtual space based on the user's operation input, and the command to perform the long distance movement is to designate a location in the field map image as the destination based on the user's operation input during the third displaying.

22. The game processing method according to claim 21, wherein the first map image is a range of the field map image around the departure point, and the second map image is a range of the field map image around the destination.

23. The game processing method according to claim 22, wherein the field map image includes a portion in which the field information is disclosed and a portion in which the field information is undisclosed, and further, when an event occurs at a location in the virtual space based on the game process, the field map image is updated such that field information of a range corresponding to the location where the event occurs is disclosed.

24. The game processing method according to claim 23, wherein in the first displaying, the first map image is generated by capturing a range around the departure point of the field map image including the portion in which the field information is disclosed and the portion in which the field information is undisclosed, and is displayed, and in the second displaying, the second map image is generated by capturing a range around the destination of the field map image including the portion in which the field information is disclosed and the portion in which the field information is undisclosed, and is displayed.

25. The game processing method according to claim 20, wherein during a period of time in the first displaying, the first map image is slid in a direction opposite to a direction from the departure point toward the destination in the map image, and is displayed, and during a period of time in the second displaying, the second map image is slid in a direction opposite to a direction from the departure point toward the destination in the map image, and is displayed.

26. The game processing method according to claim 20, wherein in the first displaying, an icon image showing a location of the player character is displayed at the departure point in the first map image, and subsequently, is deleted with first timing, and in the second displaying, the second map image without the icon image is displayed, and subsequently, the icon image is displayed at the destination in the second map image with second timing.

27. The game processing method according to claim 20, wherein further, during the waiting period, data including at least data of a field of the destination is stored into a memory, and the waiting period ends after completion of the storing.

28. The game processing method according to claim 27, wherein the first displaying is continued for at least a first period of time, and after the end of the first period of time, the second displaying is started when a second period of time has elapsed or progression of the storing has reached a level.

* * * * *